United States Patent
Christensen et al.

(10) Patent No.: US 10,516,277 B2
(45) Date of Patent: Dec. 24, 2019

(54) BATTERY CONNECTION METHOD AND APPARATUS

(71) Applicant: TRAXXAS LP, McKinney, TX (US)

(72) Inventors: Casey Christen Jens Christensen, McKinney, TX (US); Scott Rollin Michael Schmitz, Lewisville, TX (US); Otto Karl Allmendinger, Rowlett, TX (US)

(73) Assignee: TRAXXAS LP, McKinney, TX (US)

( * ) Notice: Subject to any disclaimer, the term of this patent is extended or adjusted under 35 U.S.C. 154(b) by 0 days.

(21) Appl. No.: 14/730,159

(22) Filed: Jun. 3, 2015

(65) Prior Publication Data

US 2015/0349568 A1    Dec. 3, 2015

Related U.S. Application Data

(60) Provisional application No. 62/007,403, filed on Jun. 3, 2014.

(51) Int. Cl.
*H01M 2/30* (2006.01)
*H02J 7/00* (2006.01)
*H01M 10/42* (2006.01)

(52) U.S. Cl.
CPC .............. *H02J 7/0042* (2013.01); *H01M 2/30* (2013.01); *H01M 10/425* (2013.01);
(Continued)

(58) Field of Classification Search
CPC .. H01R 13/64; H01R 13/645; H01R 13/6456; H01R 13/113; H01R 13/114;
(Continued)

(56) References Cited

U.S. PATENT DOCUMENTS

D179,946 S    3/1957   Kerr
3,794,957 A   2/1974   Winkler
(Continued)

FOREIGN PATENT DOCUMENTS

CN    201 210 314 Y     3/2009
DE    202004012366 U1   10/2004
(Continued)

OTHER PUBLICATIONS

PCT/US2015/034083; International Search Report & Written Opinion; dated Sep. 10, 2015.
(Continued)

*Primary Examiner* — Gary F Paumen
(74) *Attorney, Agent, or Firm* — Daryl R. Wright; Greg Carr

(57) ABSTRACT

An improved electrical connector for electrically connecting a rechargeable battery with an electrically powered device as well as methods of operation for use of an electrically powered device comprising the improved connector are provided. The connector may comprise one or more features including: integration of both first terminals for transmitting charging or discharging signals to and from the battery as well as one or more signal terminals for transmitting one or more balancing signals to and from the battery; implementation of communication means allowing for one or more signals comprising battery specific information to be received by the electrically powered device upon making an electrical connection with the battery; and, one or more safety features for preventing unsupported electrical connections between incompatible connector configurations. An electrically powered implemented with the improved electrical connector may detect one or more characteristics of a battery upon electrically connecting with the battery and may reconfigure one or more operational settings of the
(Continued)

electrically powered device in response to the detected characteristics to safely charge or discharge the battery.

13 Claims, 24 Drawing Sheets

(52) U.S. Cl.
CPC .......... *H02J 7/0004* (2013.01); *H02J 7/0063* (2013.01); *H02J 7/0068* (2013.01); *H01M 2010/4278* (2013.01); *H01M 2220/30* (2013.01)

(58) Field of Classification Search
CPC .... H01R 13/11; H01R 13/631; H01R 13/629; H02J 7/0042; H02J 7/0063; H02J 7/0068; H02J 7/0004; H01M 2/30; H01M 10/425; H01M 2010/4278; H01M 2220/30
USPC .......................................... 439/680, 852, 374
See application file for complete search history.

(56) References Cited

U.S. PATENT DOCUMENTS

| | | | |
|---|---|---|---|
| 4,193,655 A * | 3/1980 | Herrmann, Jr. ...... | H01R 13/502 439/166 |
| 5,049,804 A | 9/1991 | Hutchings | |
| 5,111,128 A | 5/1992 | Brannan, Jr. et al. | |
| 5,130,634 A | 7/1992 | Kasai | |
| 5,283,512 A | 2/1994 | Stadnick et al. | |
| 5,370,556 A * | 12/1994 | Olsson ................. | H01R 13/645 439/677 |
| 5,371,453 A | 12/1994 | Fernandez | |
| 5,575,674 A * | 11/1996 | Davis ..................... | H01R 24/84 439/284 |
| 5,744,937 A | 4/1998 | Cheon | |
| 5,816,842 A * | 10/1998 | Thantrakul .......... | G11B 33/122 439/374 |
| 5,822,427 A | 10/1998 | Braitberg et al. | |
| 5,844,400 A | 12/1998 | Ramsier et al. | |
| 5,865,651 A * | 2/1999 | Dague ................... | H01R 29/00 439/218 |
| 5,867,006 A | 2/1999 | Dias et al. | |
| 5,949,216 A | 9/1999 | Miller | |
| 6,007,362 A * | 12/1999 | Davis ................. | H01R 13/6456 439/358 |
| 6,014,008 A | 1/2000 | Hartzell et al. | |
| 6,022,246 A * | 2/2000 | Ko ..................... | H01R 13/6456 439/680 |
| 6,152,597 A | 11/2000 | Potega | |
| 6,184,655 B1 | 2/2001 | Malackowski | |
| 6,232,750 B1 | 5/2001 | Podrazhansky et al. | |
| 6,236,186 B1 | 5/2001 | Helton et al. | |
| 6,634,896 B1 | 10/2003 | Potega | |
| 6,746,284 B1 * | 6/2004 | Spink, Jr. ............. | H01R 13/115 439/651 |
| D494,933 S | 8/2004 | Lu | |
| 7,059,769 B1 | 6/2006 | Potega | |
| 7,104,831 B2 * | 9/2006 | Fukatsu ............. | H01R 13/5221 439/385 |
| D552,560 S | 10/2007 | Victor | |
| 7,374,460 B1 | 5/2008 | Hariharesan et al. | |
| D573,536 S | 7/2008 | Hariharesan et al. | |
| D576,557 S | 9/2008 | Hariharesan et al. | |
| D577,671 S | 9/2008 | Schnitzler | |
| D589,881 S | 4/2009 | Kok et al. | |
| 7,615,963 B2 | 11/2009 | Tashiro et al. | |
| 7,696,718 B2 | 4/2010 | Suzuki | |
| 7,736,197 B2 * | 6/2010 | Takeda ............... | H01R 13/6456 439/680 |
| 7,888,913 B1 | 2/2011 | Marty et al. | |
| 8,029,310 B2 * | 10/2011 | Shindo ................. | H01R 13/533 439/350 |
| 8,123,571 B2 * | 2/2012 | Brown ............... | H01R 13/6456 439/680 |
| D659,640 S | 5/2012 | Tseng | |
| D662,889 S | 7/2012 | Smith | |
| D665,748 S | 8/2012 | Baker et al. | |
| 8,974,244 B2 * | 3/2015 | Aihara ................. | H01R 12/724 439/374 |
| 8,998,656 B2 * | 4/2015 | Amano ................ | H01R 13/113 439/845 |
| D743,338 S | 11/2015 | Christensen et al. | |
| D743,339 S | 11/2015 | Christensen et al. | |
| 10,027,146 B2 | 7/2018 | Christensen et al. | |
| 10,075,001 B2 | 9/2018 | Christensen et al. | |
| 2002/0070702 A1 * | 6/2002 | Ragnarsson .......... | H02J 7/0045 320/101 |
| 2002/0072275 A1 * | 6/2002 | Arai .................... | H01R 13/6456 439/680 |
| 2003/0160592 A1 | 8/2003 | Murakami et al. | |
| 2004/0066174 A1 | 4/2004 | Choi | |
| 2005/0174094 A1 | 8/2005 | Purdy et al. | |
| 2006/0145661 A1 | 7/2006 | Patino et al. | |
| 2006/0194102 A1 | 8/2006 | Keshishian et al. | |
| 2007/0069688 A1 | 3/2007 | Satsuma | |
| 2007/0080660 A1 | 4/2007 | Fagan et al. | |
| 2007/0182367 A1 | 8/2007 | Partovi | |
| 2008/0007218 A1 | 1/2008 | Veselic | |
| 2008/0048614 A1 | 2/2008 | Partin et al. | |
| 2008/0261460 A1 | 10/2008 | Hariharesan et al. | |
| 2008/0297104 A1 | 12/2008 | Rao et al. | |
| 2009/0096421 A1 | 4/2009 | Seman, Jr. | |
| 2009/0289599 A1 | 11/2009 | White et al. | |
| 2010/0171460 A1 | 7/2010 | Nakajima et al. | |
| 2010/0295503 A1 | 11/2010 | Bourilkov et al. | |
| 2011/0003512 A1 | 1/2011 | Bower et al. | |
| 2011/0248680 A1 | 10/2011 | Timmons et al. | |
| 2011/0294361 A1 * | 12/2011 | Schrader ................ | H01R 13/64 439/680 |
| 2012/0109402 A1 | 5/2012 | Shelton et al. | |
| 2012/0249083 A1 | 10/2012 | Garrastacho et al. | |
| 2012/0319658 A1 | 12/2012 | White et al. | |
| 2013/0057198 A1 | 3/2013 | Gerlovin | |
| 2013/0260182 A1 | 10/2013 | Knitt et al. | |
| 2014/0239881 A1 | 8/2014 | Cassidy | |
| 2014/0245036 A1 | 8/2014 | Oishi | |
| 2014/0335739 A1 * | 11/2014 | Sato ................... | H01R 13/6456 439/680 |
| 2015/0048780 A1 | 2/2015 | Listl et al. | |
| 2015/0126075 A1 | 5/2015 | Chen et al. | |
| 2015/0180175 A1 * | 6/2015 | Yu ......................... | H01R 13/64 439/357 |
| 2015/0249360 A1 | 9/2015 | Ichikawa | |
| 2015/0255890 A1 * | 9/2015 | Xu ....................... | H01R 4/4836 439/680 |
| 2016/0087314 A1 | 3/2016 | Arashima et al. | |

FOREIGN PATENT DOCUMENTS

| | | |
|---|---|---|
| DE | 20 2012 000 291 U1 | 4/2012 |
| DE | 20 2012 103996 U1 | 1/2013 |
| DE | 202013004312 U1 | 10/2013 |
| EP | 0 780 915 A1 | 6/1997 |
| EP | 1 128 517 A3 | 12/2003 |
| EP | 2 416 407 A1 | 2/2012 |
| JP | 2005-237155 A | 9/2005 |
| JP | 2011 324426 A | 12/2011 |
| JP | 2013-021780 A | 3/2013 |
| WO | WO 99/38238 A1 | 7/1999 |
| WO | WO 2007/015605 A1 | 2/2007 |
| WO | 2010/028368 A1 | 3/2010 |
| WO | 2013/104431 A1 | 7/2013 |

OTHER PUBLICATIONS

Molex; Imperium HVHC Connector System data sheet_www.molex.com_171466-9001; May 13, 2014.
Molex; Imperium HVHC Connector System engr dwg_MDATA_DS-171466-9000; May 13, 2014.

(56) References Cited

OTHER PUBLICATIONS

Molex; Imperium HVHC Connector System application specification_J. Quiles_AS-171467-001; May 13, 2014.
Molex; Imprerium HVHC Connector System product specification_J. Quiles_PS-171467-001; May 13, 2014.
RCLogger; RFID Balancing Charger, Description http://www.rclogger.com/Innovations/RFID-Balancing-Charger-Dual-300W/RFID-Balancing-Charger-Dual-300W.html; May 20, 2014.
RCLogger; RFID Balancing Charger, Features_http://www.rclogger.com/Innovations/RFID-Balancing-Charger-Dual-300W/RFID-Balancing-Charger-Dual-300W.html; May 20, 2014.
RCLogger; RFID Balancing Charger, Gallery_http://www.rclogger.com/Innovations/RFID-Balancing-Charger-Dual-300W/RFID-Balancing-Charger-Dual-300W.html; May 20, 2014.
RCLogger; RFID Balancing Charger, Specs_http://www.rclogger.com/Innovations/RFID-Balancing-Charger-Dual-300W/RFID-Balancing-Charger-Dual-300W.html; May 20, 2014.
TJinTech; "All about lipo balance connectors"_http://www.tjinguytech.com/charging-how-tos/balance-connectors; Jun. 2, 2014.
Mark Harrison; "Wiring multi-cell batteries"; http://eastbay-rc.blogspot.com/2010/12/wiring-multi-cell-batteries.html; Dec. 29, 2012.
Robbe; "BID System"; www.krikke.net; 2014-5-20.pdf.
Robbe Modell Sport; "BID System"; youtube.com-watch_v=IIV8ieSNTBU; Mar. 5, 2012.
SBS Implementers Forum; "Smart Battery Data Specification"; smartbattery.org; Dec. 11, 1998.
SBS Implementers Forum; "Smart Battery Charger Specification"; smartbattery.org; Dec. 11, 1998.
SBS Implementers Forum; "Smart Battery System Manager Specification"; smartbattery.org; Dec. 15, 1998.
Mikado_"Vstabi Pionerr of Flybarless—Batt ID Battery Detection"; www.vstabi.info_node1740; Oct. 15, 2014.
Mikado; "Vstabi Pionerr of Flybarless—Battery ID for VBar Control"; www.vstabi.info_node1753; Nov. 29, 2014.
Mikado; "Battery ID Reader for VBar Control-Technical Data" v1.01; www.mikado-heli.de_VBarControAkkuIDLeser; 2014-11.pdf.
Jon Lampert; "iMax X200" Sample pictures by author; May 15, 2015.
Hobby King; iMax "X200 Instruction"; www.hobbyking.com_914261155X365809X45; May 15, 2015.
Jon Lampert; "Yunec Q500" Sample pictures by author; Mar. 13, 2015.
Amphenol; "Cool Power"; amphenolcanada.com; May 15, 2015.
Amphenol_"Data Center—Cool Power SlimDrawer"; http://www.amphenol-datacenter.com/PS-CoolPowerSlimDrawer.htm; May 15, 2015.
JST; "LBT-A Type Series"; May 15, 2015.
JST; "RIJ Connector" data sheet; May 15, 2015.
JST; "RWZ Connector" data sheet; May 15, 2015.
Panasonic; "B01 Stacking Connector for High Current" data sheet; May 15, 2015.
Positronic; "Scorpion Series Modular Power, Signal Connectors" catalog; May 15, 2015.
Unknown, PCT/US2015/053466; International Search Report and Written Opinion; dated Dec. 3, 2015.
Unknown, PCT/US2015/053478; International Search Report and Written Opinion; dated Nov. 23, 2015.
Unknown, DuraTrax ONYX 100, AC/DC Peak Charger, Instruction Manual; 2009.
Unknown, DuraTrax ONYX 150, AD/DC Lipo Charger, Instruction Manual; 2012.
Unknown, DuraTrax ONYX 200, AC/DC Sport Peak Charger; Instruction Manual; 2008.
Unknown, Dynamite Prophet Sport II AC/DC Charger, Operation Manual; 2010.
Unknown, Dynamite Prophet Plus II, AC/DC Powered Peak Detection Fast Charger; Manual; revised Dec. 2009.
Unknown, Dynamite Prophet Sport Lipo; Instruction Manual; 2011.
Unknown, Radient Ascend Multi-Chemistry AC/DC Peak Detection Balance Charger; Owner's Manual; 2011.
Unknown, Radient Primal Multi-Chemistry AC Balance Charger; Owner's Manual; 2011.
Unknown, Reedy 526-S Balance Charger; no date available.
Unknown, Traxxas EZ-Peaks 5 AMP Fast Charger Instructions; 2013.

\* cited by examiner

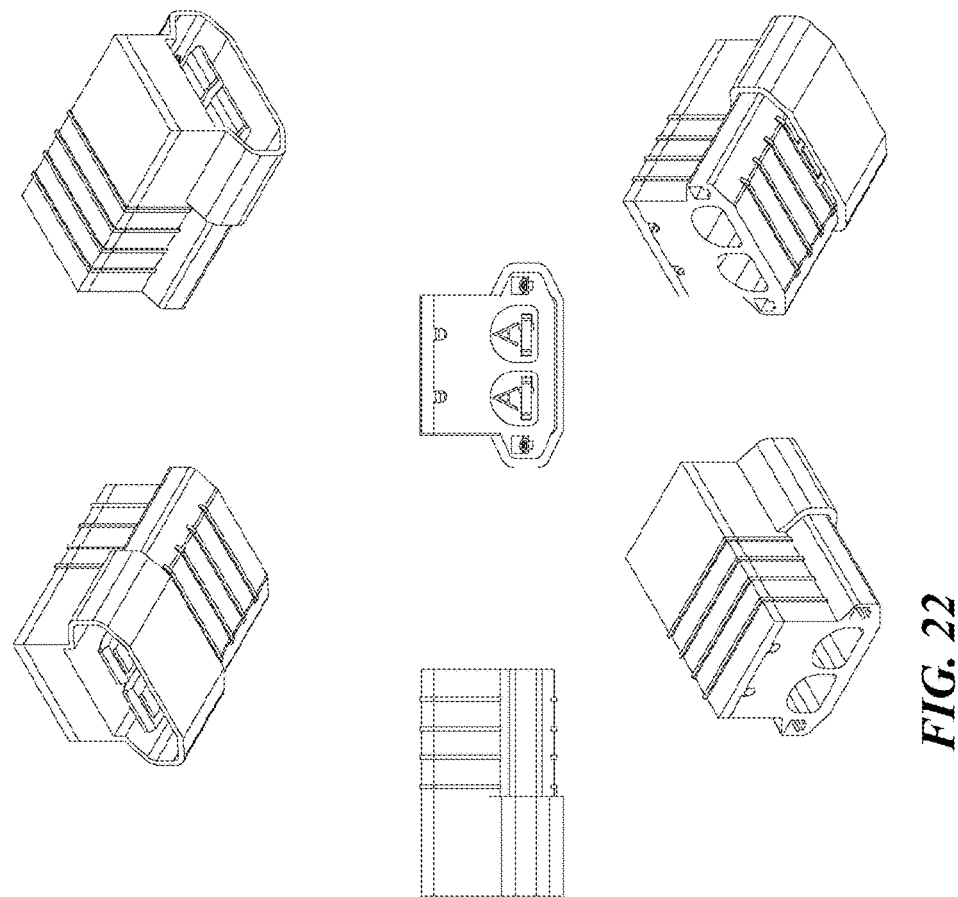
FIG. 22
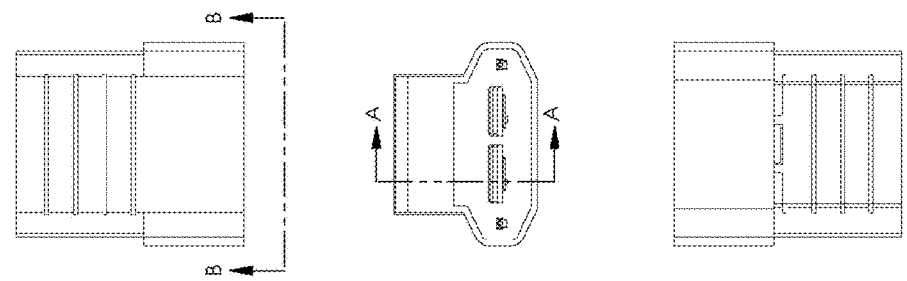

BATTERY CONNECTION METHOD AND APPARATUS

CROSS-REFERENCE TO RELATED APPLICATIONS

This application relates to, and claims the benefit of the filing date of, U.S. Provisional Patent Application Ser. No. 62/007,403 entitled INTELLIGENT BATTERY POWERED SYSTEM CONNECTOR, filed Jun. 3, 2014, the entire contents of which are incorporated herein by reference for all purposes

BACKGROUND OF THE INVENTION

Field of the Invention

The present invention relates to battery-powered systems and, more particularly, to an intelligent battery connector for battery-powered systems.

Description of the Related Art

Radio Controlled (RC) model vehicles appeal to people of all ages and skill sets. Many people who own RC vehicles do not understand all of the technical details about their vehicles or equipment, but only want to drive their vehicles and have fun. Using batteries that are not compatible with a particular vehicle's Electronic Speed Control (ESC) or battery charger may have catastrophic consequences for the battery, model vehicle, charger, or ESC. During daily use of RC model vehicles, multiple battery types and chemistry types may be used. Battery voltages can vary widely from less than 4.0V to greater than 25V. Many different battery chemistries are available; for example NiCd (Nickel Cadmium), NiMH (Nickel Metal Hydride), LiPo (Lithium Polymer) and Pb (Lead Acid). Each time a different type of battery is used, settings need to be modified on both the ESC (low voltage cutoff, for example) and battery charger (charge termination voltage, for example) to ensure the battery is not damaged. As customers and other users in the RC community use different types of batteries, it has become evident that most users are not properly educated on the differences and requirements of each different type; especially as it relates to the battery chemistry. A mismatch of settings on the battery charger may cause serious damage to property, particularly to the battery being charged. There is a need to reduce the danger of using a battery with an improperly paired device and reduce the amount of time it takes to modify the ESC and battery charger settings for improving operation while also adding safety features to protect against damage from operation according to improper modes or parameters.

SUMMARY

Systems and methods for detecting conditions of a battery and configuring a battery charger or ESC for charging or discharging the battery in accordance with parameter settings suitable for the particular battery in use are provided.

BRIEF DESCRIPTION OF THE DRAWINGS

For a more complete understanding of the present invention and the advantages thereof, reference is now made to the following Detailed Description taken in conjunction with the accompanying drawings, in which:

FIGS. 22 and 23 are several views of embodiments of a male connector also shown in FIG. 1B;

DETAILED DESCRIPTION

Figure 1A:
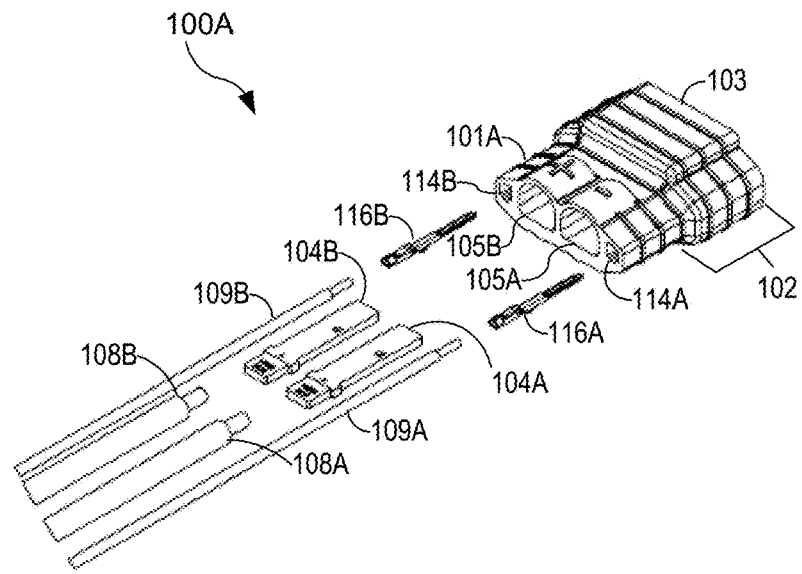
FIG. 1A is an exploded view of an embodiment of a male connector also shown in FIGS. 7A-7C and 20.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning electronic communications, electro-magnetic signaling techniques, RFID and the like, have been omitted inasmuch as such details are not considered necessary to obtain a complete understanding of the present invention, and are considered to be within the understanding of persons of ordinary skill in the relevant art.

The battery connector embodiments described herein present several features, functions, and characteristics for improving the safety and ease of use of a rechargeable battery. Additionally, control methods for battery charging or discharging devices, such as battery chargers or Electronic Speed Controllers (ESCs), which may be implemented with one or more connector ports having some or all of the features, functions, and characteristics of the battery connector embodiments described herein are provided.

The battery connector embodiments described may be suitable for use with batteries of several chemistries and/or capacities, may provide for single port connection of a battery with a device charging or discharging the battery, may provide one or more means of communication of battery-specific information to a device charging or discharging the battery, and may incorporate one or more features for preventing unsupported electrical connections. In an embodiment, unsupported electrical connections between a battery and a charging or discharging device, such as a reverse polarity connection, connection between a battery of an incompatible chemistry type with a charging or discharging device, and/or connection of a battery of an incompatible capacity with a charging or discharging device may be prevented through implementation of one or more keying features within the housings of the connector.

The battery connectors described herein may be configured to be suitable for use with several battery chemistries, including Lithium Polymer (LiPo) type batteries and Nickel metal hydride (NiMH) type batteries. In such embodiments, the battery connectors described herein may be provided with both main power terminals and balance signal terminals within a single connector housing, allowing for single plug electrical connection between a battery comprising a battery connector as described herein with a charging or discharging device provided with a compatible battery connector, as described herein. In such embodiments, the charging or discharging device may be configured with logic for detecting the battery chemistry and/or capacity of a battery electrically coupled to the device via the connectors having both main power and balance signal terminals within a single connector housing.

Additionally, or alternatively, in an embodiment, the connectors described herein may be implemented with components allowing for communication between a battery and a charging or discharging device to which the battery is electrically connected. For example, wireless communication between a battery and a charging or discharging device to which the battery is electrically connected may be supported through implementation of radio frequency identification (RFID) components, such as a RFID tags and readers. Battery specific information, such as the battery chemistry type, capacity, cell count, suitable or optimal charge rates, the number of charges on the battery, and the like may be communicated via the RFID components. The cell count may be a value indicating the number of cells electrically connected to one another in series comprising the battery. A cell may be several cells electrically connected together in parallel or an individual cell. In such embodiments, the RFID components may be disposed within the respective connectors at locations configured to ensure that the RFID components are within range to communicate with one another at all times when the connectors are electrical connected to one another, preventing unsuitable or unsafe charging or discharging operations from being performed by the charging or discharging device.

Integrated Balance Terminals in Siamese Wiring Arrangement

Figure 1B:
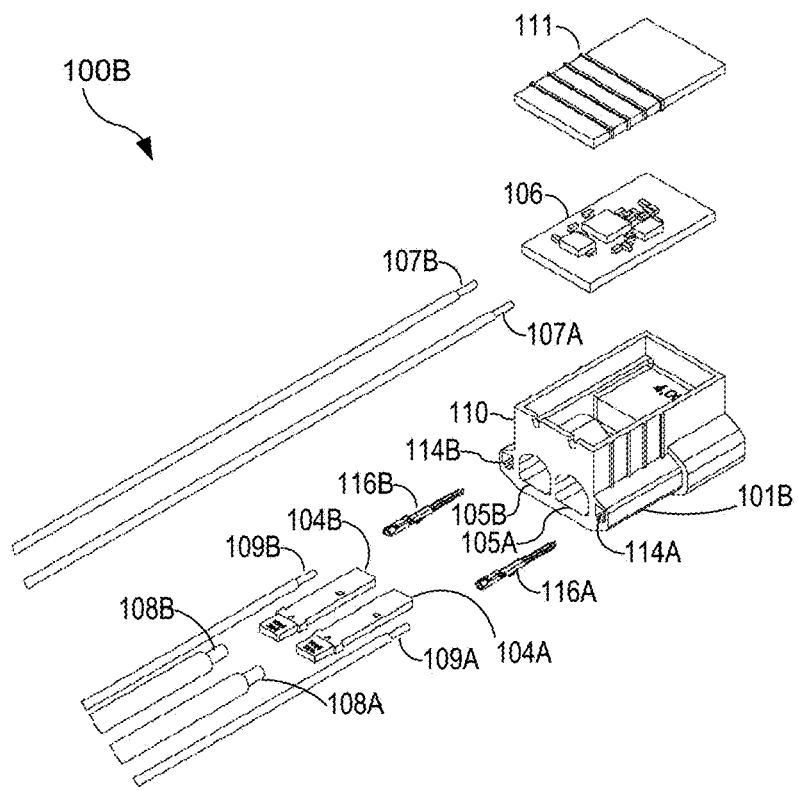
FIG. 1B is an exploded view of the male connector also shown in FIGS. 13-15.

Referring to FIGS. 1A and 1B, embodiments of a male connector 100 are shown. The male connectors 100A, B may be configured to electrically connect with a female connector 200, described later in this specification. According to the male connector 100A, B embodiments shown, the male connectors 100A, B may comprise a male housing 101A, B, respectively, two male power terminals 104A, B, two male balance terminals 116A, B, two male power wires 108A, B, and two male signal wires 109A, B. In alternative embodiments, additional, fewer, or different components than those shown in the embodiments of FIGS. 1A and 1B may be provided. For example, in an embodiment, additional, fewer, or no male balance terminals 116A, B and male signal wires 109A, B may be provided. Additionally, or alternatively, one or more keying features may be implemented within a male extended portion 102 of the male housing 101A, B.

Further, in an alternative embodiment of the male connector 100A, one or more male communication devices, such as an RFID reader, for example, may be provided. In such alternative embodiments, the relative locations of one or more components of the male connector 100A may differ from those shown in the embodiment of FIG. 1A. It is noted that a male communication device 106 is provided within the embodiment of the male connector 100B shown in FIG. 1B. The male communication device 106 and associated functionality are not described in this section, but are discussed later in this specification. In this section, features, functions, and components included within both of the male connector 100A, B embodiments shown are discussed.

According to the embodiments of FIGS. 1A and 1B, the male connector 100A, B may include the male housing 101A, B, respectively, which may be composed of an electrically insulating material. The male housing 101A, B may comprise a plurality of internal features for at least partially enclosing and electrically isolating one or more internal components of the male connector 100A, B from one another as well as from external objects. As shown, the male housing 100A, BA, B may comprise a male extended portion 102, a male raised portion 103, two male power terminal receptacles 105A, B, and two male balance terminal receptacles 114A, B. In alternative embodiments, the male housing 100A, BA, B may be implemented with additional, fewer, or different features and components than those shown.

The male extended portion 102 may be configured to form a socket portion for circumferentially surrounding one or more internal electrically conductive components of the male connector 100A, B, such as the male power terminals 104A, B and male balance terminals 116A, B. The socket formed by the male extended portion 102 may be spaced from the respective male terminals 104, 116 and configured to provide an area within which a plug portion of the female connector 200 may be received.

Figure 13:
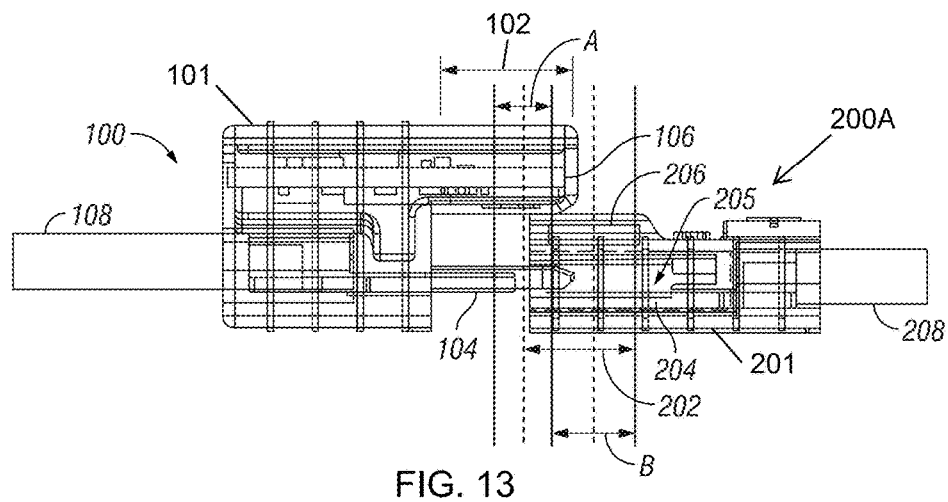
FIG. 13 is a side phantom view of an embodiment of a male connector and an embodiment of a female connector in unconnected configuration.
Figure 14:
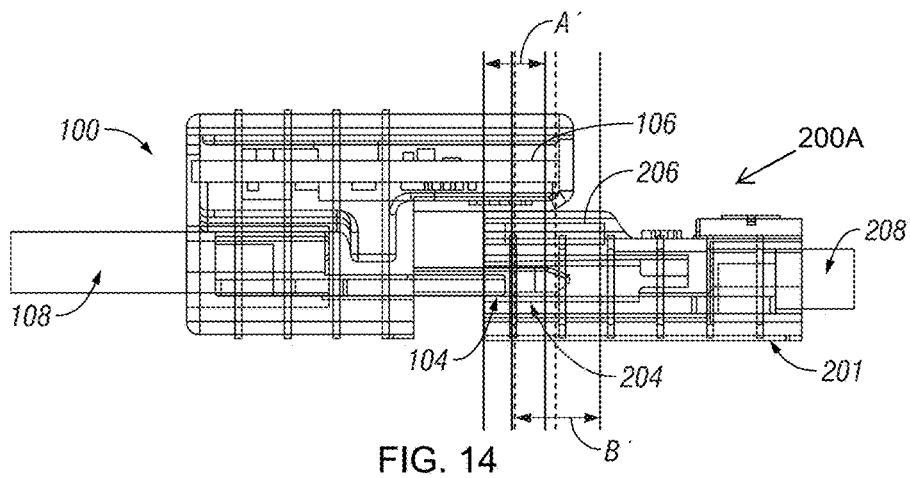
FIG. 14 is a side phantom view of an embodiment of a male connector and an embodiment of a female connector in a first connected configuration.
Figure 15:
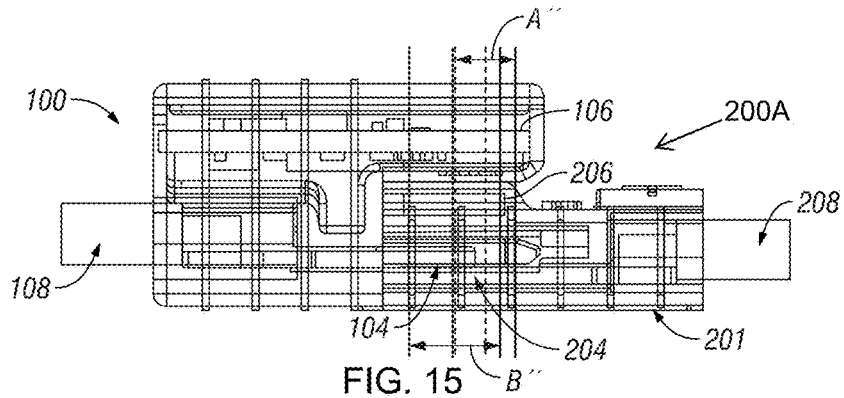
FIG. 15 is a side phantom view of an embodiment of a male connector and an embodiment of a female connector in a second connected configuration.

In an alternative embodiment, the male extended portion 102 may, instead, form a shroud only partially circumferentially surrounding the respective male terminals 104, 116 of the male connector 100A, B (as shown in the embodiment FIGS. 13-15). In such embodiments, the shroud formed by the male extended portion 102 may be spaced from the respective male terminals 104, 116 and configured to allow for reception of a plug portion of the female connector 200 by the male connector 100A, B. In certain embodiments, the male extended portion 102 may be implemented with one or more keying features, such as grooves, notches, protrusions, and the like, for preventing unsupported electrical connections via the connector 100A, B, such as electrical connections between incompatible devices and batteries. Certain specific keying features which may be provided are discussed in detail later in this specification.

In an embodiment, the male housing 101A, B may comprise the male power terminal receptacles 105A, B for receiving the male power terminals 104A, B, respectively, as shown in FIGS. 1A, 1B and 7A-7C. According to the embodiments shown in FIGS. 1A and 1B, the male connector 100A, B may comprise two male power terminal receptacles 105A, B for receiving each of the two male power terminals 104A, B, respectively. In alternative embodiments, additional or fewer male power terminals 104 may be provided as well as additional or fewer male power terminal receptacles 105. Regardless of the quantity of male power terminal receptacles 105 provided, each may comprise one or more internal features, such as notches, protrusions, grooves, and the like configured to hold the male power terminals 104 in place when received within the respective male power terminal receptacles 105.

The male power terminals 104A, B may comprise an electrically conductive material, such as brass, copper, or bronze. The male power terminals 104A, B shown may be made from a standard plate of material and punched formed to the correct size and configuration, among other methods of forming. A portion of the length of the male power terminals 104A, B may protrude into the male extended portion 102 of the male housing 101A, B. In an embodiment, the male extended portion 102 of the male housing 101A, B may provide an insulating barrier extending circumferentially around the portions of the male power terminals 104A, B protruding into the male extended portion 102. While received within the respective receptacles 105A, B, the male power terminals 104A, B may be electrically insulated from each other as well as from the male balance terminals 116A, B of the male connector 100A, B by the respective male power terminal receptacles 105A, B as well as one or more internal walls within the male extended portion 102 of the male housing 101A, B.

Figure 7A:
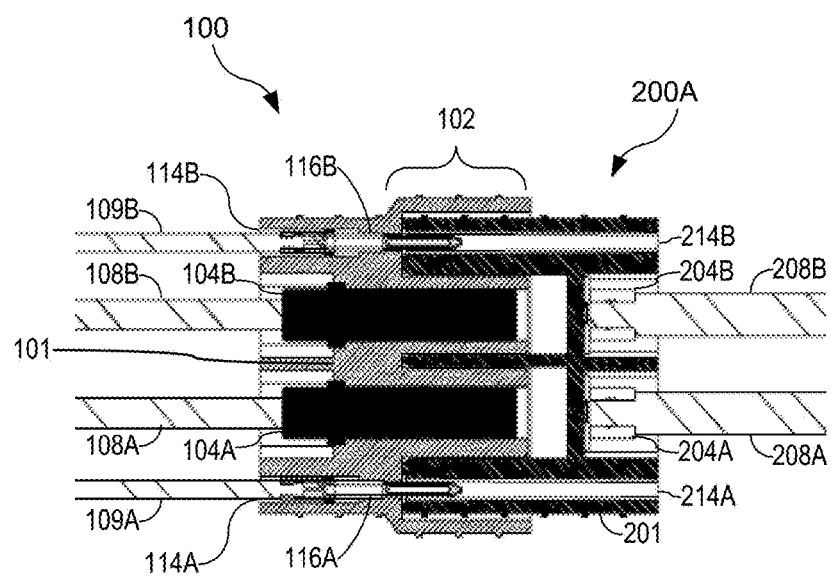
FIGS. 7A-7C is a sectional view taken along section line B-B of FIG. 8A.
Figure 7B:
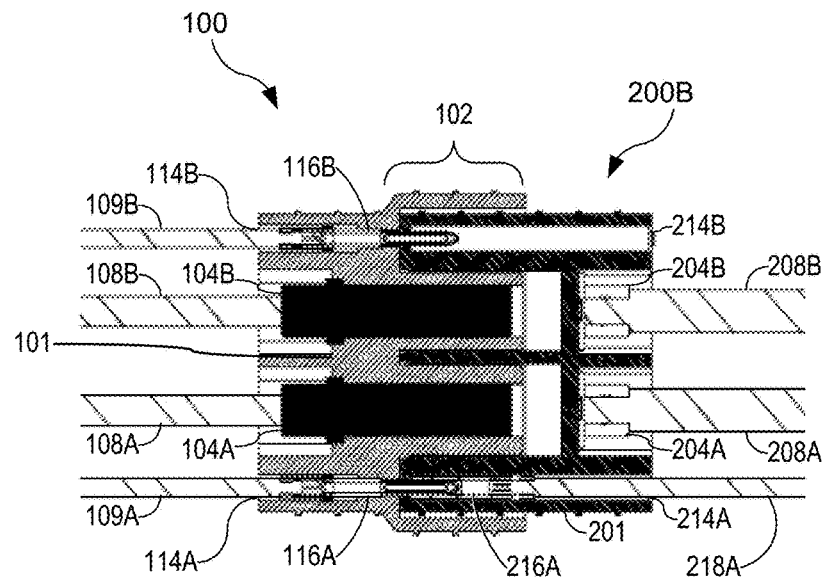
Figure 7C:
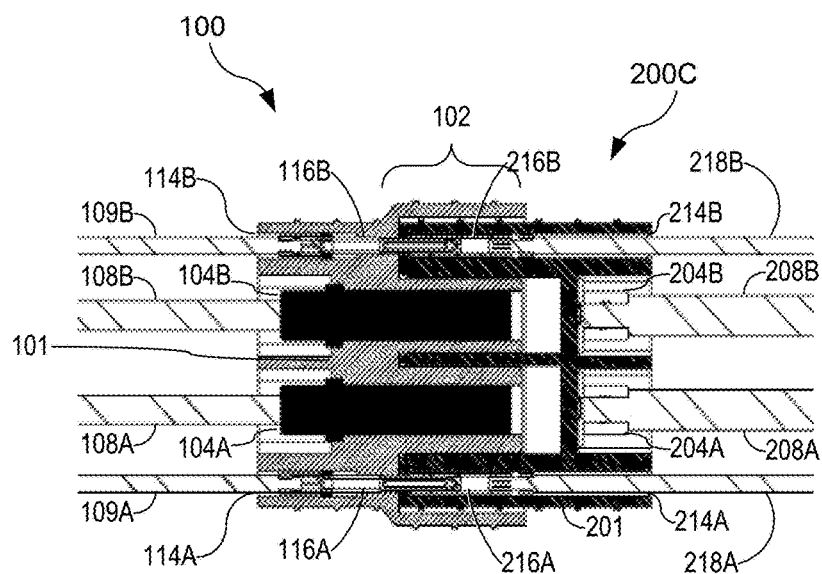
Figure 8A:
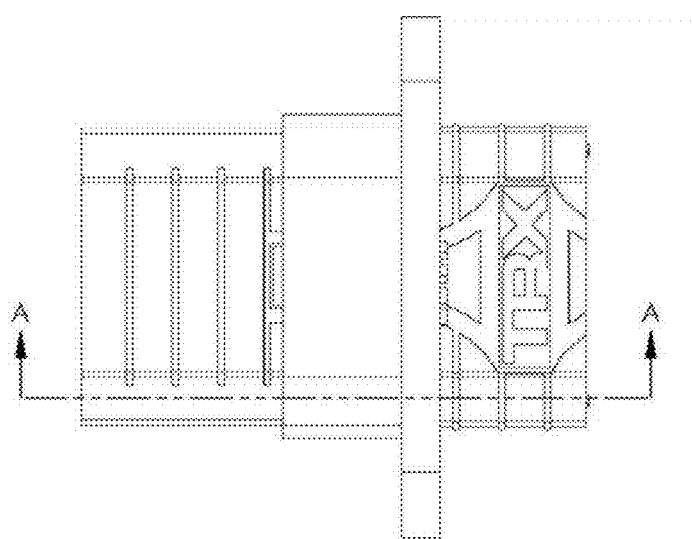
FIG. 8A is a plan view of an electrically connected male and female connector.
Figure 8B:
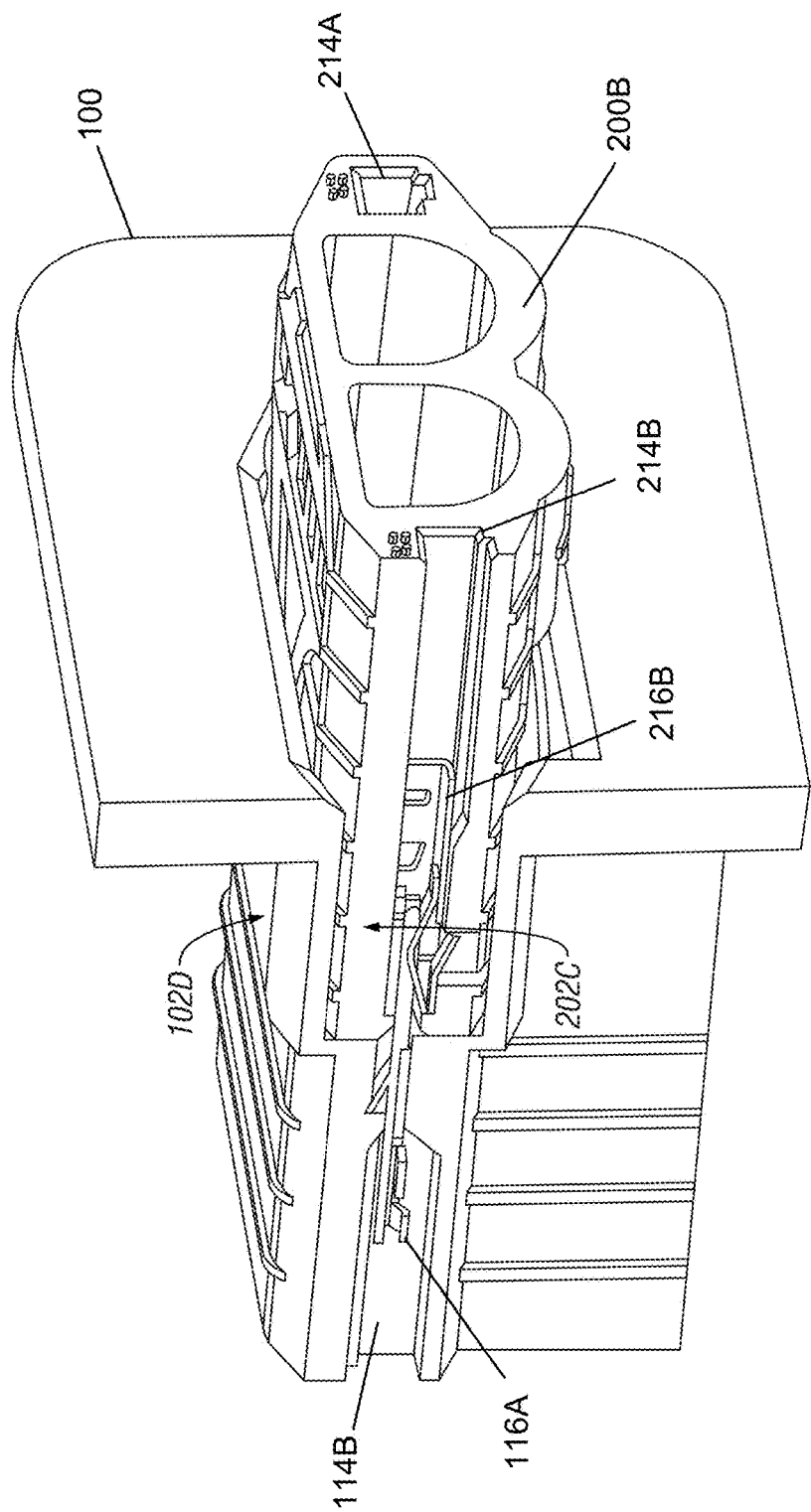
FIG. 8B is a cut away view along line A-A of FIG. 8A.

The male power terminals 104A, B may electrically couple to the respective male power wires 108A, B, as shown in FIGS. 7A-7C. In an embodiment, the male power wires 108A, B may be high-current capacity wires, such as 12 AWG wires, for example, for receiving and transmitting one or more signals, which may include one or more power signals for charging or discharging a battery. The male power terminals 104A, B may electrically couple to the male power wires 108A, B, respectively, via soldered connections, mechanical fastening, standard insulated and non-insulated connector fittings, crimping, or any other suitable methods of electrically coupling a wire conductor to a terminal. The male power wires 108A, B, respectively, may be electrically insulated along their lengths using one or more layers of insulating material (not labeled).

The male power terminals 104A, B may be configured to electrically connect with corresponding female power terminals of a female connector at the portions of the male power terminals 104A, B protruding into the male extended portion 102. The portion of the male power terminals 104A, B (not labeled) protruding into the male extended portion 102 for contacting corresponding female power terminals may comprise the contact surfaces of the male power terminals 104A, B. The male connector 100A, B may receive one or more power signals via the male power terminals 104A, B when the male connector 100A, B is electrically connected to a female connector 200 at the male power terminals 104A, B. In an embodiment, the male connector 100A, B may be implemented within an electrically powered device, such as an ESC or battery charger, for example, which may operate to charge or discharge a battery electrically connected to the electrically powered device at the male connector 100A, B. In such embodiments, the male power wires 108A, B may electrically connect with one or more internal components of the electrically powered device to directly or indirectly electrically connect the internal components of the electrically powered device to a battery via the male power terminals 104A, B of the male connector 100A, B.

As shown in the embodiments of FIGS. 1A, 1B and 7A-7C, the male housing 100A, B may comprise the male balance terminal receptacles 114A, B for receiving the male balance terminals 116A, B, respectively. The male balance terminal receptacles 114A, B may comprise one or more internal features, such as notches, protrusions, grooves, and the like configured to hold the respective male balance terminals 116A, B in place when received within the male balance terminal receptacles 114A, B. A portion of the length of the respective male balance terminals 116A, B may protrude beyond the male balance terminal receptacles 114A, B and into the male extended portion 102 of the male housing 100A, B. The male extended portion 102 may provide an insulating barrier around the portions of the respective male balance terminals 116A, B protruding into the male extended portion 102 in a manner similar to that described above, in reference to the male power terminals 104A, B. While received within the respective male balance terminal receptacles 114A, B, the male balance terminals 116A, B may be electrically insulated from each other as well as from the male power terminals 104A, B of the male connector 100A, B by the respective male balance terminal receptacles 114A, B as well as one or more internal walls within the male extended portion 102 of the male housing 100A, B.

The male balance terminals 116A, B may comprise an electrically conductive material, such as brass, copper, or bronze, or the like. According to the embodiment shown, the male balance terminals 116A, B may each comprise an electrically conductive pin of a type which may be used to make a pin type electrical connection. In an embodiment, for example, the male balance terminals 116A, B may each be JST type connectors of any series or pitch suitable for performing the functions described, herein. The male balance terminals 116A, B may be configured to be suitable for transmitting one or more signals for charging or discharging a battery of a type and cell count described, herein.

The male balance terminals 116A, B may electrically couple to the respective male signal wires 109A, B. The male signal wires 109A, B may be low-current capacity wires, such as 24 AWG wires, for example, for receiving and transmitting one or more signals, including one or more balance signals received via the male balance terminals 116A, B. The male balance terminals 116A, B may electrically couple to the male signal wires 109A, B, respectively, via crimped connections, soldered connections, mechanical fasteners, standard insulated and non-insulated connector fittings, or any other suitable methods of electrically coupling a wire conductor to a pin type connector terminal. The male signal wires 109A, B, respectively, may be electrically insulated along their lengths using one or more layers of insulating material.

In an embodiment, the male signal wires 109A, B may directly or indirectly electrically connect with one or more internal components of an electrically powered device within which the male connector 100A, B is implemented. According to such embodiments, one or more balance signals received via the male balance terminals 116A and/or 116B may be transmitted directly or indirectly to one or more internal components of the electrically powered device.

The male balance terminals 116A, B may each electrically connect with corresponding balance terminals of a female connector at the portions of the respective male balance terminals 116A, B protruding into the male extended portion 102. In an embodiment, the female connector may be electrically connected to a single or multi-cell battery. In such embodiments, the male balance terminals 116 may accommodate electrical connection with the individual cells of a multi-cell battery allowing for cell specific charging or discharging operation of the battery to be performed by an electrically powered device via the male connector 100A, B. For example, a commonly used rechargeable battery, a LiPo battery, may be implemented with a female connector having female balance terminals. In such an embodiment, the female balance terminals may electrically connect to one or more individual cells of the battery and may, further, electrically connect to an electrically powered device via electrical connections made with male balance terminals 116 of the male connector 100A, B. The electrically powered device may be operated to charge or discharge the individual cells of the LiPo battery to maintain the charge on each respective battery cell within a tolerance amount of one another or to prevent over or under charge conditions on one or more cells of the LiPo battery.

According to the embodiments shown in FIGS. 1A and 1B, the male connector 100A, B may be suitable for electrically connecting with batteries comprising up to three cells using the male balance terminals 116A, B as well as the main power terminals 104A, B. In alternative embodiments, additional male balance terminals 116 may be provided, as well as additional male balance terminal receptacles 114, to accommodate electrical connection with batteries having larger cell counts via the male connector 100A, B. For example, in an embodiment, additional male balance terminals 116 and male balance terminal receptacles 114 may be provided to allow the male connector 100A, B to accommodate electrical connections between higher capacity devices, such as a between an ESC or battery charger and a multi-cell battery comprising more than three cells.

Figure 19:
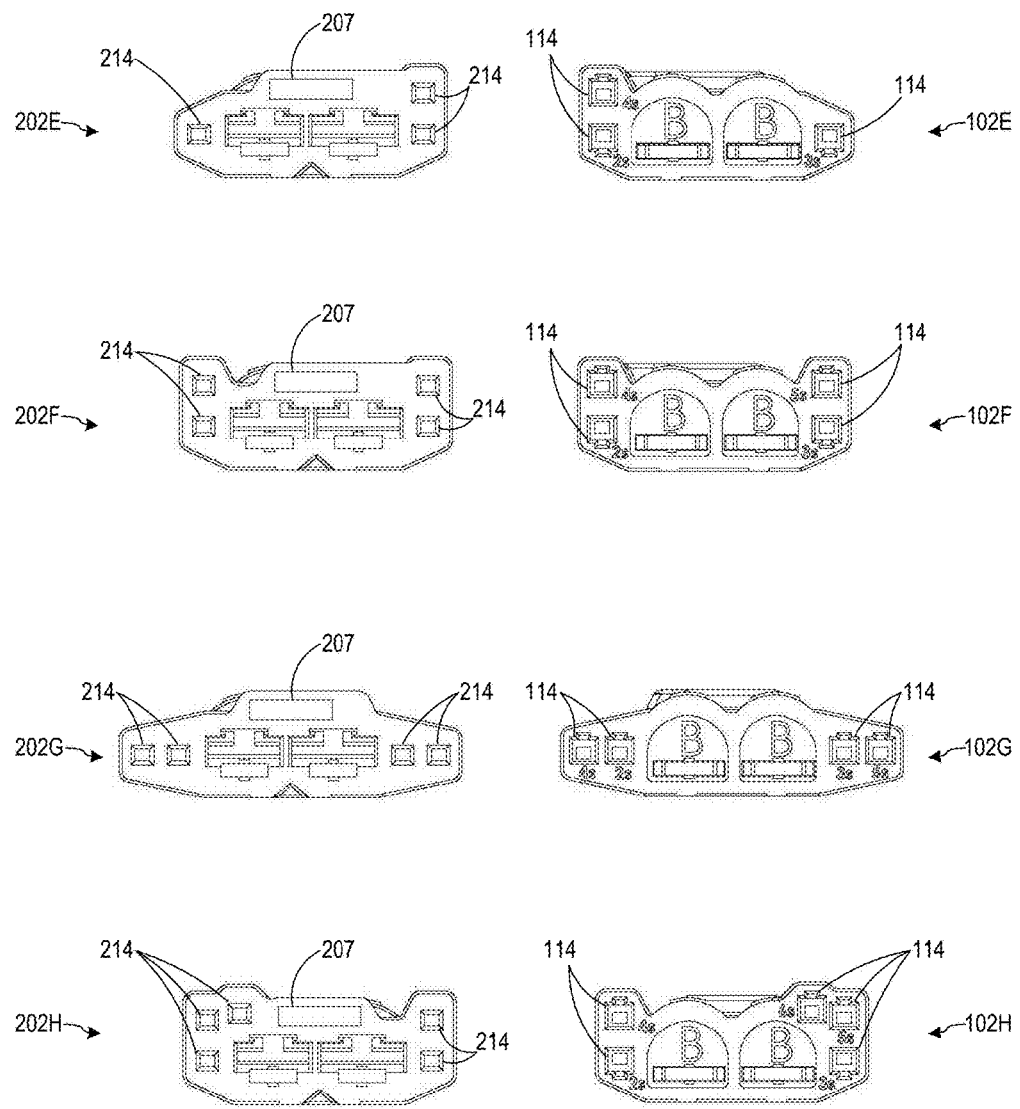
FIG. 19 is several front views of embodiments of a male connector extended portion and corresponding embodiments of a female connector extended portion with additional balance terminal receptacles.
Figure 20:
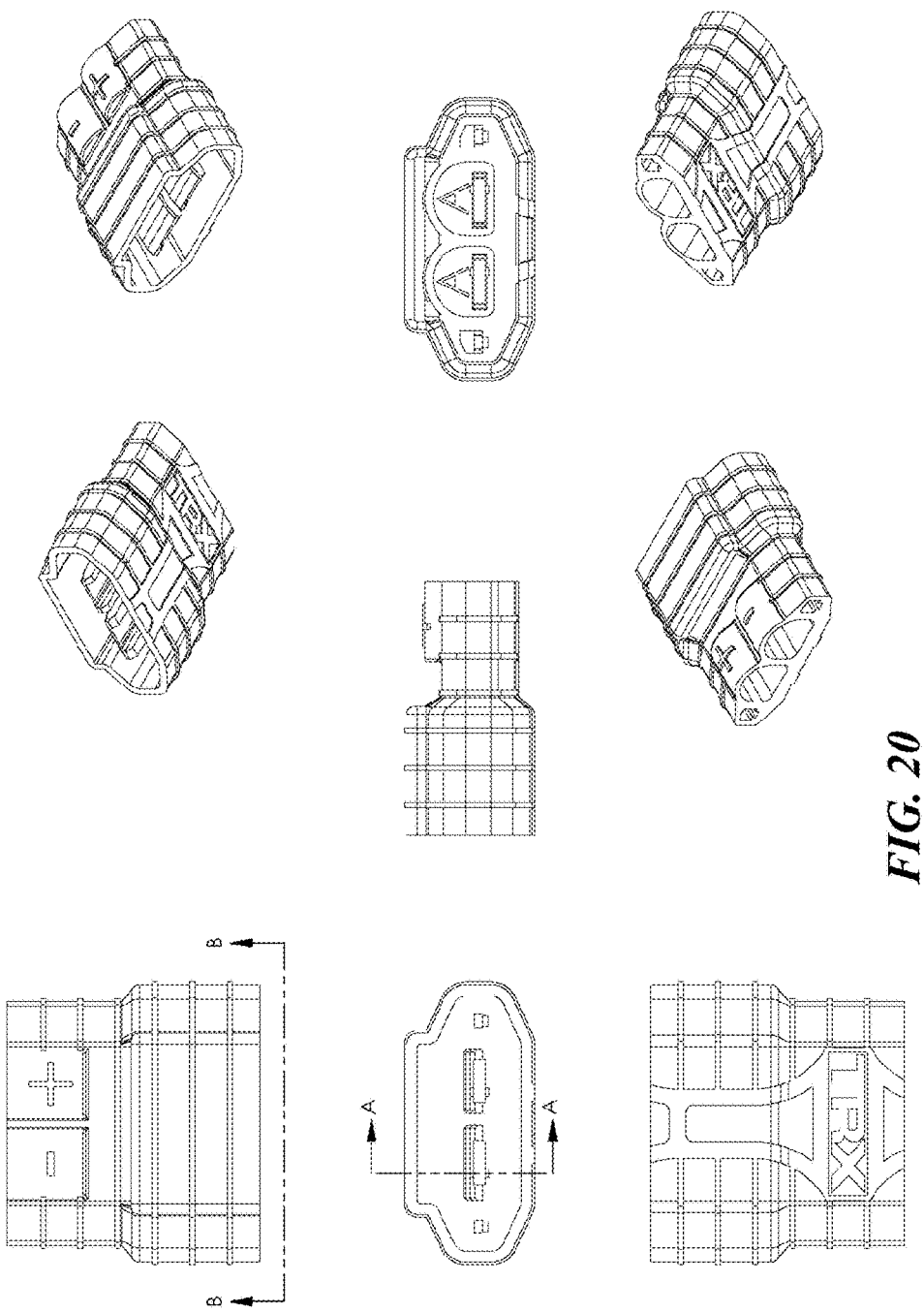
FIGS. 20 and 21 are several views of embodiments of a male connector also shown in FIG. 1A.
Figure 21:
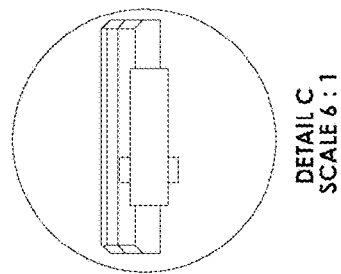
Figure 21:
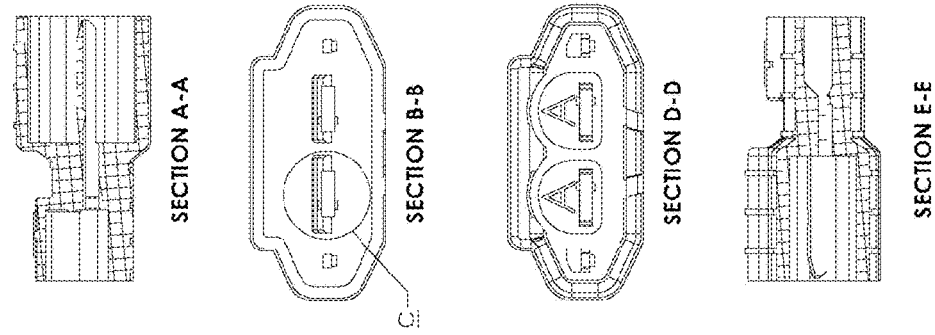
Figure 21:
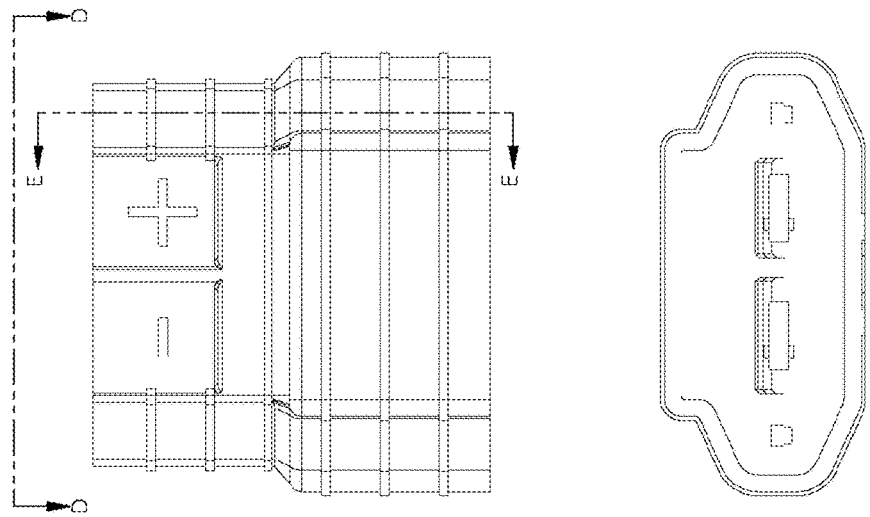

Exemplary alternative embodiments of the male extended portion 102E-H which may be implemented within the male connectors 100A, B are shown in FIG. 19. The male extended portions 102E-H may accommodate electrical connection with batteries comprising more than three cells. The embodiments of the male extended portion 102E-H shown in FIG. 19 may include additional male balance terminal receptacles 114 for receiving one or more additional male balance terminals 116. The male extended portion 102E may be implemented within an embodiment of the male connector 100 to accommodate connections with batteries comprising up to four cells. The male extended portions 102F or 102G may be implemented within an embodiment of the male connector 100 to accommodate connections with batteries comprising up to five cells. The male extended portion 102H may be implemented within an embodiment of the male connector 100 to accommodate connections with batteries comprising up to six cells. It is noted that the embodiments shown in FIG. 19 are provided for illustrative purposes, only, and shall not be construed as limiting the scope of this description.

Advantageously, for each of the embodiments described, integration of the male balance terminals 116 and the male power terminals 104 within the male connector 100A, B, may allow for all terminals of a multi-cell battery implemented with the female connector 200, described below, to be simultaneously electrically connected. Both the power terminals and balance terminals of a multi-cell battery implemented with the female connector 200 may be electrically connected with the respective male power and balance terminals 104, 116 of the male connector 100A, B via insertion of the female connector 200 within the extended portions 102 of the male connectors 100 shown in FIGS. 7A-7C and 13-15, discussed below. According to such connector configurations, the potential for a user to neglect electrically connecting one or more power or balance terminals of a battery to an electrically powered device, such as an ESC or battery charger, is eliminated.

Figure 23:
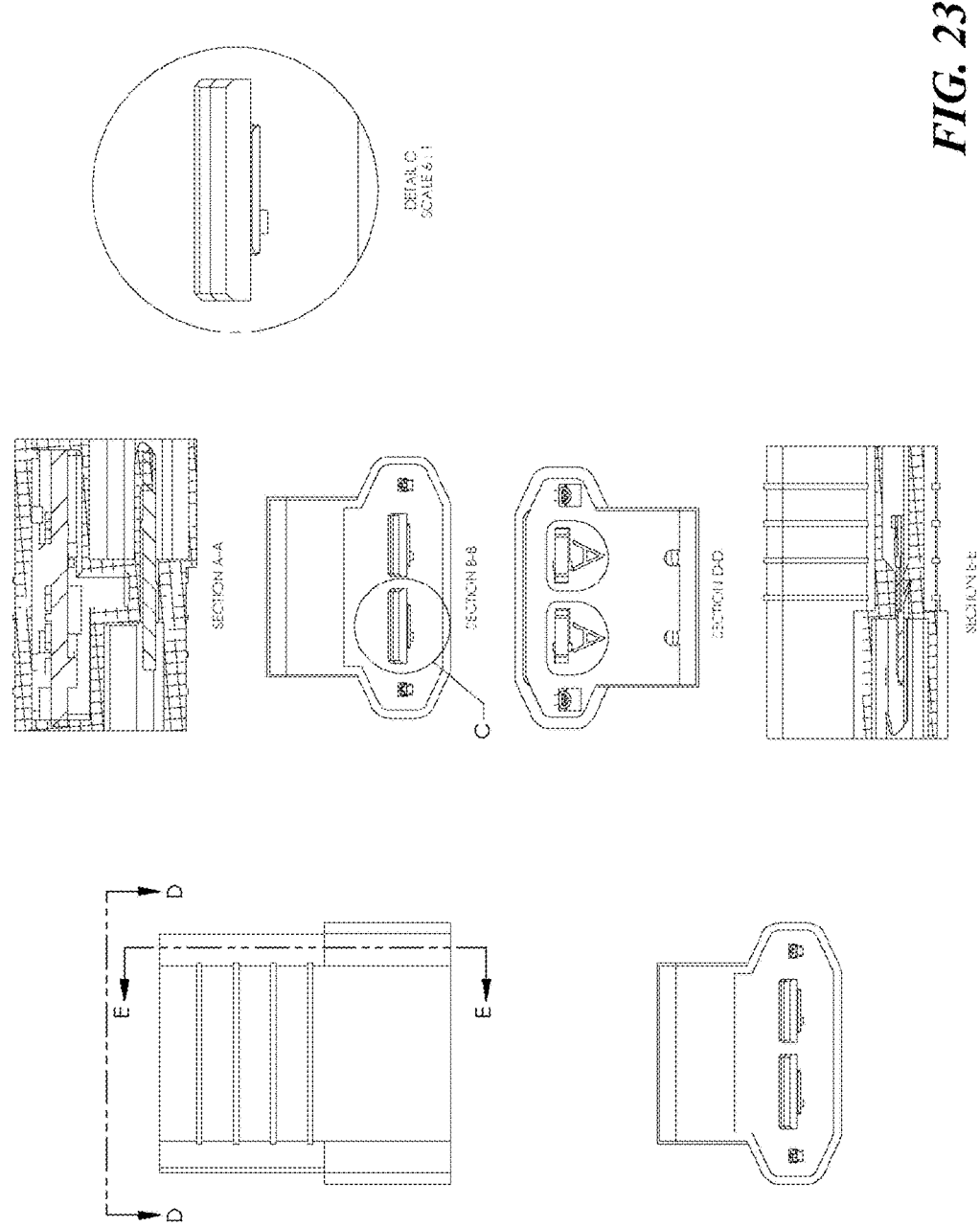

Referring to FIGS. 20-23, several additional views showing various features of the embodiments of the male connector 100A, B are provided. The features shown in FIGS. 20 and 21 correspond to features of the male connector 100A, described above. The features shown in FIGS. 22 and 23 correspond to several features of the male connector 100B which are described above. Additionally, FIGS. 22 and 23 show several features of the male connector 100B which are described later in this description. The FIGS. 20-23 provided are not specifically discussed herein to avoid inclusion of unnecessary or redundant language within this specification. The views of FIGS. 20-23 are provided for the purpose of more clearly showing aspects of the several features of the male connector 100 embodiments described above.

Figure 3A:
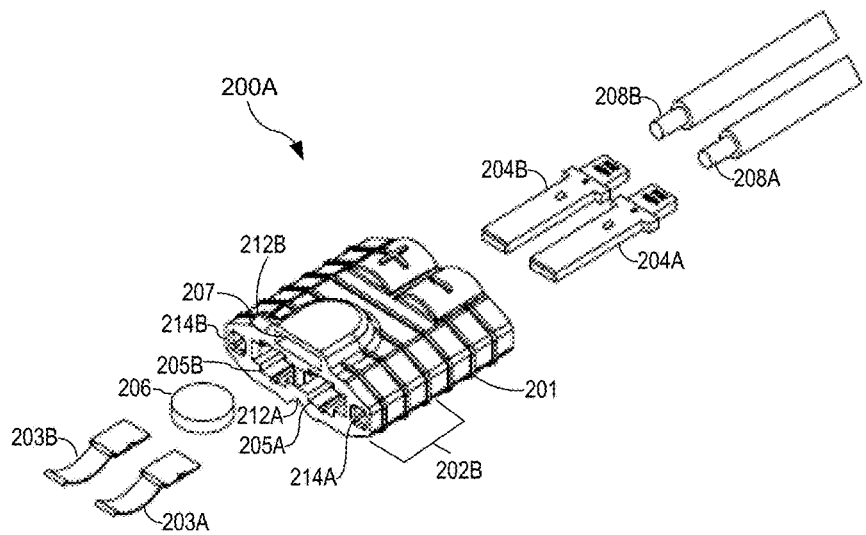
FIGS. 3A-3C are exploded views of embodiments of a female connector.
Figure 3B:
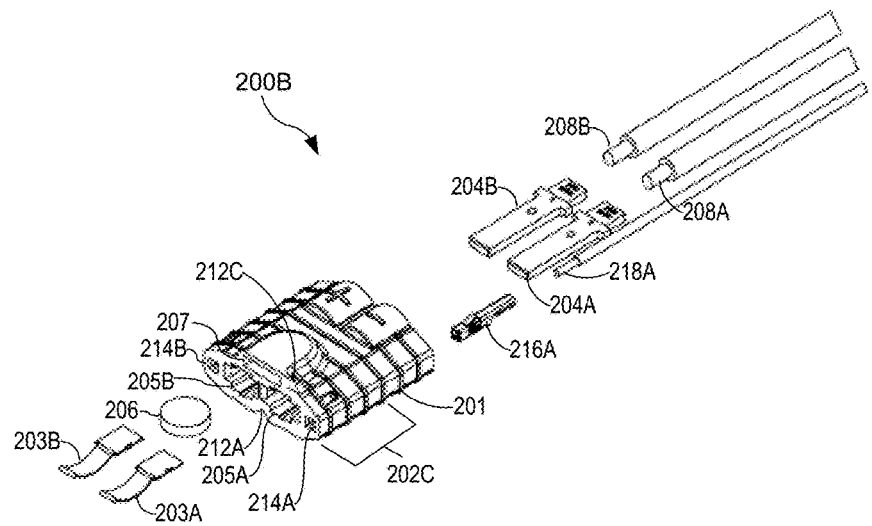
Figure 3C:
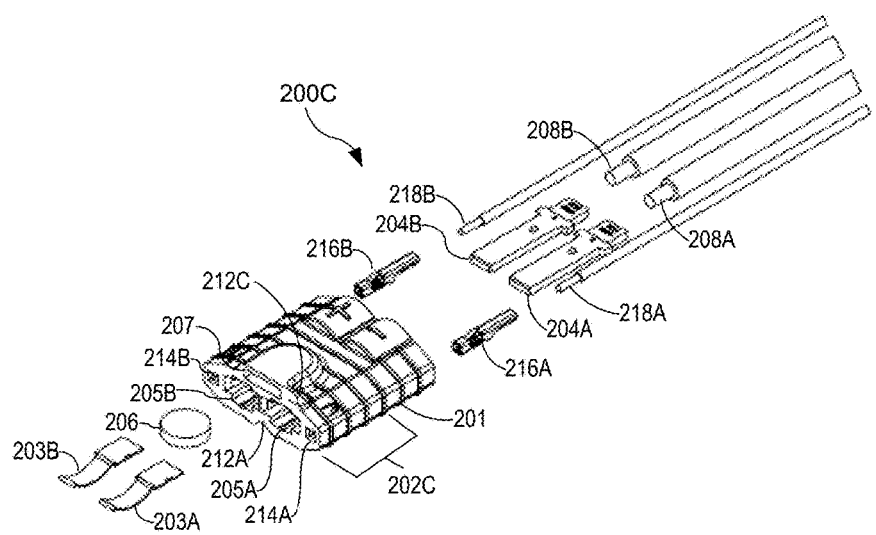

The male connector 100A, B, according to the embodiments described, may be compatible for electrically connecting with corresponding female connectors, such as the female connectors 200A-C shown in FIGS. 3A-3C. The embodiments of the female connectors 200A-C shown in FIGS. 3A-3C comprise illustrative examples of the various female connector embodiments contemplated. The specific embodiments of FIGS. 3A-3C are provided for the purpose of illustrating several features, functions, and components which may be included within an embodiment of the female connector 200. The embodiments shown, herein, shall not be construed as limiting the scope of this description to merely the embodiments shown. The male connector 100A, B may be compatible for electrically connecting with embodiments of the female connector 200 having different configurations than those of the specific embodiments shown in FIGS. 3A-3C in accordance with the male connector 100A, B embodiments and alternatives described in this specification.

Referring to FIG. 3A, an embodiment of a first female connector 200A is shown. The first female connector 200A may be utilized as an electrical connector for use with rechargeable batteries of one or more specific chemistry types. According to the embodiment shown, for example, the first female connector 200A may be configured for use with certain battery chemistries, such as NiMH type battery, for example, which do not require balanced charging or discharging operation. As shown, the first female connector 200A may comprise the female housing 201, the resilient members 203A, B, the female power terminals 204A, B, and the high current wires 208A, B. The first female connector 200A may, additionally, be provided with a communication device 206, as shown. The features, functions, and characteristics associated to such an embodiment are described later in this specification. It is noted, however, that in an alternative embodiment, the first female connector 200A may not be implemented with the communication device 206.

The first female connector 200A may comprise the female housing 201. The female housing 201 may be composed of an electrically insulating material for electrically isolating one or more components of the first female connector 200A which may be disposed within the female housing 201. According to the embodiment shown, the female housing 201 may comprise a female extended portion 202B, two female power terminal receptacles 205A, B, two female balance terminal receptacles 214A, B, a female communication device receptacle 207, and a first female keying feature 212A (discussed later in this specification). In alternative embodiments additional, fewer, or different components or features may be provided.

In alternative embodiments the female housing 201 may include a female extended portion 202 comprising a different configuration, such as any of the female extended portions 202A-D shown in FIGS. 3A-3C, 9-12, and 19, for example. Additionally, or alternatively, in an alternative embodiment the female communication device 206 may not be provided. In such embodiments, the female communication device receptacle 207 may or may not be provided. In alternative embodiments, additional or fewer female balance terminal receptacles 214 may also be provided, regardless of whether the some, all, or none of the female balance terminal receptacles 214 provided are populated. Several embodiments in which additional female balance terminals are shown in FIG. 19, which are provided for illustrative purposes, only.

According to the embodiment of FIG. 3A, the female housing 201 may comprise the second female extended portion 202B which may form a plug portion of the first female connector 200A. In alternative embodiments, the first female connector 200A may comprise any of the female extended portions 202A-H. The plug formed by the second female extended portion 202B may be configured such that it may be received within the socket or shroud formed by one or more specific embodiments of the male extended portion 102 which may be implemented within the male connector 100A, B. In an embodiment, the second female extended portion 202B may comprise one or more keying features, such as grooves, notches, protrusions, and the like, which may correspond to one or more keying features implemented within a specific embodiment of the male connector 100A, B. Specific keying features that may be provided are discussed later in this specification.

In an embodiment, the female housing 201 may comprise the female power terminal receptacles 205A, B. The female power terminal receptacles 205A, B may each comprise channels passing through the female housing 201. The female power terminal receptacles 205A, B may be configured to partially enclose and electrically insulate the female power terminals 204A, B, respectively. In an embodiment, the female power terminal receptacles 205A, B, respectively, may comprise one or more internal features, such as notches, protrusions, grooves, and the like configured to hold the respective female power terminals 204A, B in place when received within the female power terminal receptacles 205A, B. The female power terminals 204A, B may be disposed within the female housing 201 such that the female housing 201 may provide an insulating barrier extending circumferentially around the female power terminals 204A, B. While received within the respective female power terminal receptacles 205A, B, the female power terminals 204A, B may be electrically insulated from each other by the respective female power terminal receptacles 205A, B as well as one or more internal walls of the female housing 201.

The female power terminal receptacles 205A, B may additionally be configured to receive the male power terminals 104A, B, respectively, when the plug formed by the second female extended portion 202B is at least partially inserted within the male extended portion 102. When received within the respective female power terminal receptacles 205A, B, the male power terminals 104A, B may be electrically connected with the respective female power terminals 204A, B. Additionally, or alternatively, the first female connector 200A may include the resilient members 203A, B. The resilient members 203A, B, respectively, may be disposed within the female power terminal receptacles 205A, B. In an embodiment, the resilient members 203A, B may be configured to deform from their free shape to provide a biasing force for pressing the female power terminals 204A, B into contact with the respective male power terminals 104A, B of the male connector 100A, B when the first female connector 200A is electrically connected to the male connector 100A, B. In alternative embodiments, the first female connector 200A may comprise additional, fewer, or no resilient members 203A, B.

The female power terminals 204A, B may comprise electrically conductive plates of material which may be disposed within the respective female power terminal receptacles 205A, B. In an embodiment, the female power terminals 204A, B may be composed of brass, copper, bronze, or the like. The female power terminals 204A, B shown may be made from a standard plate of material and punch formed to the correct size and configuration, among other methods of forming. As shown in FIG. 3A, the female power terminals 204A, B may electrically couple to the female power wires 208A, B, respectively. In an embodiment, the female power wires 208A, B may be high-current capacity wires, such as 12 AWG wires, for example, configured to receive and/or transmit one or more power signals. The female power terminals 204A, B may electrically couple to the wires 208A, B, respectively, via soldered connections, mechanical fastening, standard insulated and non-insulated connector fittings, crimping, or any other suitable methods of electrically coupling a wire conductor to a terminal. The female power wires 208A, B, respectively, may be electrically insulated along their lengths using one or more layers of insulating material (not labeled).

The female balance terminal receptacles 214A, B may each comprise channels passing through the female housing 201. The female balance terminal receptacles 214A, B may be configured to partially enclose and electrically insulate the female balance terminals 216A, B, respectively, when provided. Further, in an embodiment, the female balance terminal receptacles 214A, B, respectively, may comprise one or more internal features, such as notches, protrusions, grooves, and the like for receiving the female balance terminals 216, if provided, within the female balance terminal receptacles 214A, B. It is noted that in the current embodiment, as shown, no female balance terminals 216 are provided. As such, the female balance terminal receptacles 214A, B may be unpopulated.

In an embodiment, the first female connector 200A may be implemented within a rechargeable battery. The female power terminals 204A, B may operatively electrically connect to positive and negative electrical circuits, respectively, of the battery via the wires 208A, B. In such an embodiment, one or more power signals for charging or discharging the battery may be transmitted to or from an electrically powered device to which the battery is electrically connected via the female power terminals 204A, B.

Referring to FIG. 7A, a section view showing the electrical connections made when the female extended portion 202 (not labeled) of the first female connector 200A is inserted within the corresponding male extended portion 102 of the male connector 100A, B is shown. The electrical connections shown may comprise a typical arrangement for electrically connecting a NiMH type battery to an electrically powered device via electrical connections made between the male connector 100A, B and the first female connector 200A. As shown, the female power terminals 204A, B may electrically connect with the respective male power terminals 104A, B of the male connector 100A, B when the female extended portion 202 of the first female connector 200A is inserted within the corresponding male extended portion 102 of the male connector 100A, B. When electrically connected, one or more power signals may be transmitted via the electrical connections shown. In an embodiment, for example, an ESC or battery charger may receive one or more power signals from a rechargeable battery electrically connected to the ESC or battery charger via the electrical connections made between the male connector 100A, B and the first female connector 200A, as shown in FIG. 7A. Importantly, according to the current arrangement, no signal, or signals, may be received or transmitted via the male balance terminals 116A, B since no corresponding female balance terminals 216 are provided.

In an embodiment, a smart ESC or charger may detect the absence of one or more balancing signals received via the balance terminals 116A, B of the male connector 100A, B to determine one or more characteristics of a battery electrically connected to the smart ESC or charger at the male connector 100A. The smart ESC or charger may, for example, determine the battery chemistry or cell count from absence of one or more balancing signals received via the balance terminals 116A, B. Further, the smart ESC or charger may set or modify one or more parameter settings defining one or more aspects of a charging or discharging operation, such as setting or modifying a low voltage cutoff, setting or modifying a charge current voltage, setting or modifying a charge or discharge mode, or some other similar parameter at least partially defining a charging or discharging operation, for example.

Referring to FIG. 3B, a second female connector 200B is shown. As shown, the second female connector 200B may comprise the female housing 201, the resilient members 203A, B, the female power terminals 204A, B, and the high current wires 208A, B, the female balance terminal 216A, and the female signal wire 218A. One or more of the components comprising the second female connector 200B may comprise some or all of the features, functions, and characteristics as described above in reference to the first female connector 200A. Additionally, the second female connector 200B may include the female balance terminal 216A, which may be disposed within the female balance terminal receptacle 214A and may electrically couple to the female signal wire 218A. According to the specific embodiments shown, the second female connector 200B may, additionally, be provided with a communication device 206. The features, functions, and characteristics associated to such an embodiment are described later in this specification. It is noted, however, that in an alternative embodiment, the second female connector 200B may not be implemented with the communication device 206.

According to the embodiment shown, the second female connector 200B may be implemented with the female balance terminal 216A which may be disposed within the female balance terminal receptacle 214A. The female balance terminal receptacle 214A may comprise a channel passing through the female housing 201. The female balance terminal receptacle 214A may be configured to partially enclose and electrically insulate the female balance terminal 216A. In an embodiment, the female balance terminal receptacle 214A may comprise one or more internal features, such as notches, protrusions, grooves, and the like configured to hold the female balance terminal 216A in place within the female balance terminal receptacles 214A. According to the embodiment shown, while received within the female balance terminal receptacle 214A, the female balance terminal 216A may be electrically insulated from the other female power terminals 204 by the female balance terminal receptacle 214A walls. The female balance terminal receptacle 214A may additionally be configured to receive the male balance terminal 116A when the plug formed by the first female extended portion 202 is at least partially inserted within the corresponding male extended portion 102 of the male connector 100A. When received within the female balance terminal receptacle 214A, the male balance terminal 116A may be electrically connected with the female balance terminal 216A.

The female balance terminal 216A may comprise an electrically conductive material such as brass, copper, or bronze, or the like, and may be configured to receive and electrically connect with an electrically conductive pin type terminal. In an embodiment, for example, the female balance terminal 216A may be a receptacle portion of a JST type connector. In such an embodiment, the female balance terminal 216A may be a receptacle portion of any series or pitch suitable for performing the functions described, herein, and suitable for receiving and/or transmitting one or more balance signals for charging or discharging batteries of the types and capacities described, herein.

As shown in FIG. 3B, the female balance terminal 216A may electrically couple to the female signal wire 218A. The female signal wire 218A may be low-current capacity wire, such as 24 AWG wire, for example, for receiving and transmitting one or more signals, including one or more balance signals. In an embodiment, the female balance terminal 216A may electrically couple to the female signal wire 218A via a crimped connection, soldered connection, a mechanical fastener, a standard insulated and non-insulated connector fitting, or any other suitable means for electrically coupling a wire conductor to a connector. The female signal wires 218A, B, respectively, may be electrically insulated along their lengths using one or more layers of insulating material (not labeled).

In an embodiment, the second female connector 200B may be utilized as an electrical connector for use with rechargeable batteries of one or more specific chemistry types and/or cell counts. According to the embodiment shown, for example, the second female connector 200B may be configured for use with battery chemistries suitable for use in a two cell configuration, such as 2S LiPo type battery, for example, which may require balanced charging or discharging operation.

Certain battery types, such as LiPo batteries, may include balance taps internal to the battery for reading individual cell voltages of one or more cells comprising the battery. Importantly, during charging or discharging operation of such batteries, a charge imbalance between the respective cells of the battery may create a harmful or hazardous condition. Such batteries may be provided with a female connector, such as the second female connector 200B, for example, which may include one or more female balance terminals 216, such as the female balance terminal 216A, for electrically connecting with balance taps within a battery. The female balance terminals 216 provided may transmit one or more signals from the battery indicating one or more individual cell voltages of one or more cells comprising the battery to a device electrically connected to the respective female balance terminals 216 and charging or discharging the battery. When implemented within a 2S LiPo battery, the female signal wire 218A of the second female connector 200B may directly or indirectly electrically couple with one or both individual cells within the 2S LiPo battery.

Referring to FIG. 7B, a section view showing the electrical connections made when the plug portion formed by the female extended portion 202 of the second female connector 200B is inserted within the corresponding male extended portion 102 of the male connector 100A, B is shown. This may be a typical assembly of a male and female connector for electrically connecting a 2S LiPo battery to an electrically powered device, such as an ESC or battery charger, for charging or discharging the 2S LiPo battery. As shown, the female power terminals 204A, B may electrically connect with the male power terminals 104A, B of the male connector 100A, B when the female extended portion 202 of the second female connector 200B is at least partially inserted within the corresponding male extended portion 102 of the male connector 100A.

When electrically connected, one or more power signals may be received from or transmitted to the male power terminals 104A, B of the male connector 100A, B by the 2S LiPo battery via the electrical connections made between respective male power terminals 104A, B and the female power terminals 204A, B. In an embodiment, an ESC or battery charger may directly charge or discharge the 2S LiPo battery via the one or more power signals received or transmitted across the electrical connections made between the respective male power terminals 104A, B and the female power terminals 204A, B.

Additionally, the female balance terminal 216A may electrically connect with the male balance terminal 116A of the male connector 100A, B when the female extended portion 202 of the second female connector 200B is at least partially inserted within the corresponding male extended portion 102 of the male connector 100A. When electrically connected, one or more balance signals may be received from or transmitted to 2S LiPo battery via the electrical connection made between the male balance terminal 116A and the female balance terminal 216A. In an embodiment, an ESC or battery charger may directly charge or discharge the 2S LiPo battery via the one or more balance signals received or transmitted across the electrical connections made between the respective male balance terminal 116A and the female balance terminal 216A.

Importantly, at least one balancing signal may be received by an electrically powered device electrically connected to a 2S LiPo battery via the electrical connection made between the female balance terminal 216A and the male balance terminal 116A. Further, no balancing signal may be received by an electrically powered device electrically connected to a 2S LiPo battery via the male balance terminal 116B since no corresponding female balance terminal 216B is provided within the second female connector 200B. In an embodiment, a smart ESC or charger may detect the voltage of one or more balancing signals received via the balance terminal 116A of the male connector 100A, B to determine one or more characteristics of a battery electrically connected to the smart ESC or charger at the male connector 100A. The smart ESC or charger may, for example, determine the battery chemistry or cell count from the detection, or non-detection, of one or more balancing signals received via the balance terminal 116A. Further, the smart ESC or charger may set or modify one or more parameter settings defining one or more aspects of a charging or discharging operation, such as setting or modifying a low voltage cutoff, setting or modifying a charge current voltage, setting or modifying a charge or discharge mode, or some other similar parameter at least partially defining a charging or discharging operation, for example.

Referring to FIG. 3C, a third female connector 200C is shown. As shown, the third female connector 200C may comprise the female housing 201, the resilient members 203A, B, the female power terminals 204A, B, and the high current wires 208A, B, the female balance terminals 216A, B, and the female signal wires 218A, B. One or more of the components comprising the third female connector 200C may comprise some or all of the features, functions, and characteristics as described above in reference to the second female connector 200B. Additionally, the third female connector 200C may include the female balance terminal 216B, which may be disposed within the female balance terminal receptacle 214B and may electrically couple to the female signal wire 218B. According to the specific embodiments shown, the third female connector 200C may, additionally, be provided with a communication device 206. The features, functions, and characteristics associated to such an embodiment are described later in this specification. It is noted, however, that in an alternative embodiment, the third female connector 200C may not be implemented with the communication device 206.

According to the embodiment shown, the third female connector 200C may be implemented with the female balance terminals 216A, B which may be disposed within the respective female balance terminal receptacles 214A, B. The female balance terminal receptacles 214A, B may each comprise a channel passing through the female housing 201. The female balance terminal receptacles 214A, B may be configured to partially enclose and electrically insulate the respective female balance terminals 216A, B. In an embodiment, the female balance terminal receptacles 214A, B may each comprise one or more internal features, such as notches, protrusions, grooves, and the like configured to hold the respective female balance terminals 216A, B in place within the female balance terminal receptacles 214A, B. According to the embodiment shown, while received within the respective female balance terminal receptacles 214A, B, the female balance terminals 216A, B may be electrically insulated from the female power terminals 204 by the respective female balance terminal receptacle 214A, B walls. The female balance terminal receptacles 214A, B may additionally be configured to receive the respective male balance terminals 116A, B when the plug formed by the female extended portion 202 is at least partially inserted within the corresponding male extended portion 102 of the male connector 100A. When received within the respective female balance terminal receptacles 214A, B, the male balance terminals 116A, B may be electrically connected with the respective female balance terminals 216A, B.

The female balance terminals 216A, B may comprise an electrically conductive material such as brass, copper, or bronze, or the like, and may be configured to receive and electrically connect with an electrically conductive pin type terminal. In an embodiment, for example, the female balance terminals 216A, B may each be receptacle portions of a JST type connector. In such an embodiment, the female balance terminals 216A, B may be a receptacle portion of any series or pitch suitable for performing the functions described, herein, and suitable for receiving and/or transmitting one or more balance signals for charging or discharging batteries of the types and capacities described, herein.

As shown in FIG. 3C, the respective female balance terminals 216A, B may electrically couple to the female signal wires 218A, B, respectively. The female signal wires 218A, B may each be low-current capacity wires, such as 24 AWG wires, for example, for receiving and transmitting one or more signals, including one or more balance signals. In an embodiment, the respective female balance terminals 216A, B may electrically couple to the respective female signal wires 218A, B via crimped or soldered connections, mechanical fasteners, standard insulated or non-insulated connector fittings, or any other suitable means for electrically coupling a wire conductor to a connector terminal. The female signal wires 218A, B, respectively, may be electrically insulated along their lengths using one or more layers of insulating material (not labeled).

In an embodiment, the third female connector 200C may be utilized as an electrical connector for use with rechargeable batteries of one or more specific chemistry types and/or cell counts. According to the embodiment shown, for example, the third female connector 200C may be best suited for use with batteries having three cells, such as a 3S LiPo type battery, for example, which may require balanced charging or discharging operation. It is noted, however, that the third female connector 200C may be suitable for use with single and two cell batteries, as well, although one or more female balance terminals 216A and/or 216B as well as one or more female signal wires 218A and/or 218B would be unused in such applications. When implemented within a 3S LiPo battery, the respective female balance wires 218A, B of the third female connector 200C may directly or indirectly electrically couple with one or more individual cells within the 3S LiPo battery for transmission of one or more balance signals between the 3S LiPo battery and an electrically powered device to which the 3S LiPo battery is electrically connected.

Referring to FIG. 7C, a section view showing the electrical connections made when the plug portion formed by the female extended portion 202 of the third female connector 200C is inserted within the corresponding male extended portion 102 of the male connector 100A, B is shown. This may be a typical assembly of a male and female connector for electrically connecting a 3S LiPo battery to an electrically powered device, such as an ESC or battery charger, for charging or discharging the 3S LiPo battery.

As shown, the female power terminals 204A, B may electrically connect with the male power terminals 104A, B of the male connector 100A, B when the female extended portion 202 of the third female connector 200C is at least partially inserted within the corresponding male extended portion 102 of the male connector 100A. When electrically connected, one or more power signals may be received from or transmitted to the male power terminals 104A, B of the male connector 100A, B by the 3S LiPo battery via the electrical connections made between respective male power terminals 104A, B and the female power terminals 204A, B. In an embodiment, an ESC or battery charger may directly charge or discharge the 3S LiPo battery via the one or more power signals received or transmitted across the electrical connections made between the respective male power terminals 104A, B and the female power terminals 204A, B.

Additionally, the female balance terminals 216A, B may electrically connect with the respective male balance terminals 116A, B of the male connector 100A, B when the female extended portion 202 of the third female connector 200C is at least partially inserted within the corresponding male extended portion 102 of the male connector 100A. When electrically connected, one or more balance signals may be received from or transmitted to 3S LiPo battery via the electrical connections made between the respective male balance terminals 116A, B and the female balance terminals 216A, B. In an embodiment, an ESC or battery charger may directly charge or discharge the 3S LiPo battery via the one or more balance signals received or transmitted across the electrical connections made between the respective male balance terminals 116A, B and the female balance terminals 216A, B.

Importantly, at least one balancing signal may be received by an electrically powered device electrically connected to a 3S LiPo battery via the electrical connection made between the female balance terminals 216A, B and the respective male balance terminals 116A, B. In an embodiment, a smart ESC or charger may detect the voltage of one or more balancing signals received via the balance terminal 116A of the male connector 100A, B to determine one or more characteristics of a battery electrically connected to the smart ESC or charger at the male connector 100A. The smart ESC or charger may, for example, determine the battery chemistry or cell count from the detection, or non-detection, of one or more balancing signals received via the balance terminal 116A. Further, the smart ESC or charger may set or modify one or more parameter settings defining one or more aspects of a charging or discharging operation, such as setting or modifying a low voltage cutoff, setting or modifying a charge current voltage, setting or modifying a charge or discharge mode, or some other similar parameter at least partially defining a charging or discharging operation, for example.

As shown in FIGS. 7B and 7C, a single female balance terminal 216 may be needed to accommodate charging and discharging operation of a 2S LiPo battery while two balance terminals 216 may be needed to accommodate charging and discharging operation of a 3S LiPo battery. In further alternative configurations, the female connector 200 may be provided with additional balance terminals 216 to accommodate charging and discharging operation of batteries comprising four or more cells. Accordingly, the male connector 100A, B may be similarly provided with additional male balance terminals 116 for accommodating charging and/or discharging operation of such larger cell batteries. Such alternative embodiments of the male and female connectors, configured to accommodate larger multi-cell batteries may comprise components, features, and functions similar to those described in herein, and below, while comprising additional balance terminals and corresponding wiring for electrically connecting with the balance taps of a larger multi-cell battery.

Referring to FIG. 19, several alternative male and female extended portions 102E-H, 202E-H, respectively, are shown. The male and female extended portions 102E-H, 202E-H shown may include additional balance terminal receptacles 114, 214 for receiving additional male and female balance terminals required to accommodate charging and discharging operation of multi-cell batteries implemented with four cell (see 102E, 202E), five cell (see 102F and 102G, 202F and 202G), and six cell (see 102H, 202H) batteries. Each embodiment shown may be incorporated into a male or female connector 100, 200 embodiment similarly configured to accommodate the additional balance terminals 116, 216 and may be operated in accordance with devices and methods similar to those described herein and below.

As noted above, multi-cell batteries, such as LiPo batteries, may require that all balance taps of the battery be electrically connected to an electrically powered device which may be charging or discharging the multi-cell battery to prevent potentially damaging and unsafe charging and/or discharging of the multi-cell battery. If the balance taps are not electrically connected during a charging operation, the battery can become dangerous and cause injury or property damage. Additionally, if the balance taps are not electrically connected during a discharging operation, the cells of the battery may be discharged below a minimum charge, damaging the battery and potentially preventing recharging of the battery. Providing a connector, such as the female connectors 200, which may be implemented with a multi-cell rechargeable battery and include female balance terminals 216 integrated within a single connector as the female power terminals 204 ensure that the balance taps within a multi-cell battery are electrically connected to an electrically powered device at all times when the battery is electrically connected to the device at the female power terminals 204.

Figure 4:
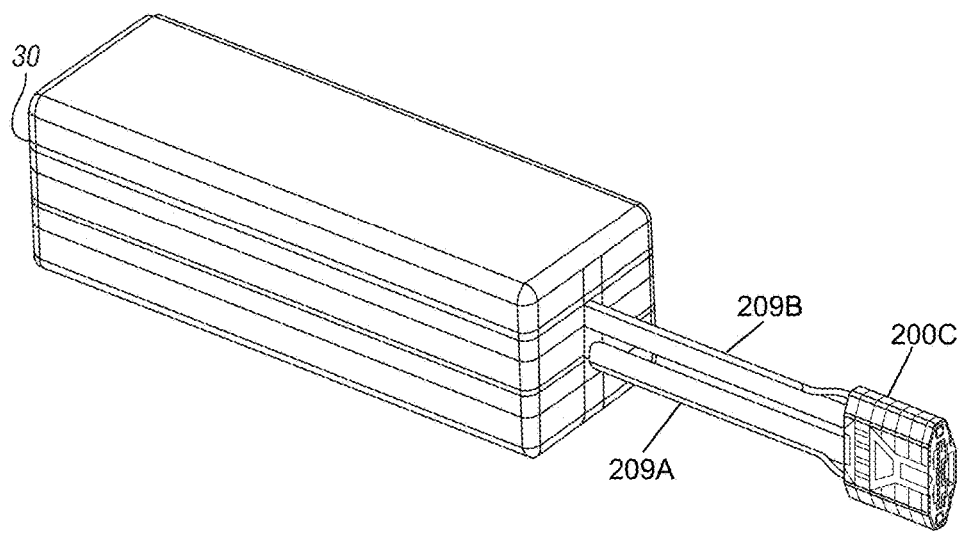
FIG. 4 depicts a battery with an embodiment of a female connector.
Figure 5A:
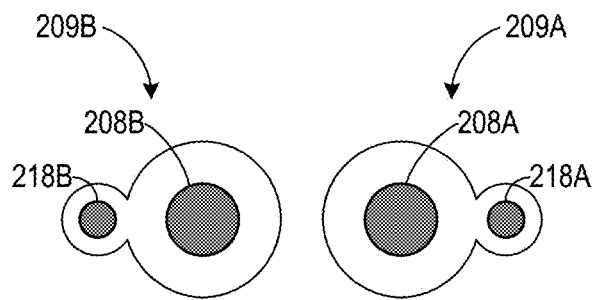
FIG. 5A is a cross-sectional view of a female connector shown in FIG. 4.
Figure 5B:
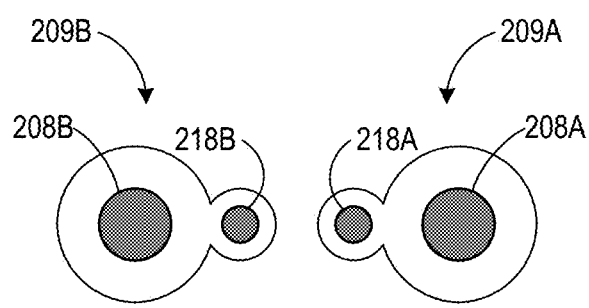
FIG. 5B is a cross-sectional view of an alternative embodiment of a female connector.

Referring now to FIGS. 4 and 5A, a typical wiring arrangement for providing protection for the female signal wires 218A, B of the third female connector 200C when implemented with the battery 30, which may be a 3S LiPo battery, is shown. An alternative wiring arrangement, in which the relative positions of the respective female power wires 208A, B and female signal wires 218A, B is shown in FIG. 5B. Virtually all LiPo batteries are implemented balance taps, wiring, and terminals. During use, the balance taps, wiring, and terminals can be damaged. When used with radio controlled model vehicles, for example, the balance taps, wiring, and terminals of a multi-cell battery may experience rough handling, harsh driving and operating conditions, and impacts that may damage the balance taps, wiring, and terminals of the multi-cell battery. In fact, the most commonly damaged components of LiPo batteries is damage to the balance taps, wiring, and terminals of the LiPo battery. During use, the small wires (typically 24 AWG or smaller) can tear out of the LiPo pack, rub through the wire coating and damage the wires, or be ripped complete off of the pack.

The embodiments of FIGS. 4, 5A, and 5B are provided to show wiring arrangements which may be implemented with the male connectors 100 or the female connectors 200 described herein which may comprise at least one signal wire 118, 218. According to the particular embodiment shown, the Siamese style wiring arrangements may provide for electrically insulating the respective power and signal wires connecting the cells of the battery 30 to the third female connector 200C. One or more collections of wires comprising at least one female power wire 208 and one or more female signal wires 218 may be enclosed within a single piece of molded wire insulation 209A, B along their respective lengths. The molded wiring insulation 209A, B may physically couple the smaller gauge (24 AWG, for example) female signal wires 218A, B to the respective large gauge (12 AWG, for example) female power wires 208A, B. As shown in FIGS. 5A and 5B, the respective female signal wires 218A, B and female power wires 208A, B enclosed within the respective molded wire insulation 209A, B remain electrically insulated from one another as a portion of the insulating material comprising the molded wire insulation 209A, B is interposed between the respective female signal wires 218A, B and female power wires 208A, B.

The Siamese wiring arrangement may improve the reliability of the male connectors 100 and the female connectors 200 by improving the resistance to damage of the signal wires 109, 218, respectively, caused by bending, twisting, or impacts with sharp or heavy objects experienced by the signal wires 109, 218, respectively. In each such instance, the respective large gauge power wires 108, 208 may shield, resist, or absorb forces that may otherwise damage the signal wires 109, 218. Further, when the Siamese wiring arrangement is implemented with male connectors 100 and/or the female connectors 200, respectively, kinking and twisting of the respective signal wires near the electrical wire to terminal couplings of the respective connectors 100, 200 may be eliminated. The relative locations of the signal terminal receptacles 114, 214 and the power terminal receptacles 105, 205 of the connectors 100, 200 may be positioned to provide for substantially straight line paths along a portion of the lengths of the respective power wires 108, 204 and signal wires 109, 118 along the lengths of the respective wires proximal to the connectors 100, 200.

Keying Features

Referring to FIGS. 9-12, several male extended portion 102 configurations as well as several female extended portion 202 configurations are shown. The configurations shown may comprise no mechanical keying features 112, 212, one mechanical keying feature 112, 212, or a plurality of mechanical keying features 112, 212. The mechanical keying features 112, 212 shown may be implemented to prevent unsupported electrical connections between a male connector 100A, B and a female connector 200. An unsupported electrical connection may be a connection between two incompatible devices or, alternatively, may be a reverse polarity connection.

As shown in the embodiments of FIGS. 9-12, the male extended portions 102 A-D configurations may be configured to permit electrical connection only with a battery having a corresponding keying feature 112, 212 configuration. According to the embodiments shown, the four different male extended portion 102A-D configurations may be: Sub-C NiMH Specific; 2/3A NiMH Specific; LiPo; and, Legacy. Each of the male extended portion 102A-D configurations shown may allow for only electrical connection with a female connector 200 implemented with the corresponding female extended portion 202A-D and may correspond to a specific compatible battery chemistry and/or cell count, or may correspond to more than one specific battery chemistries and/or cell counts. It is noted that the particular embodiments shown in FIGS. 9-12 are provided for illustration, only, and are not intended to limit the scope of the keying features 112, 212 to only those of the embodiments shown.

Figure 9:
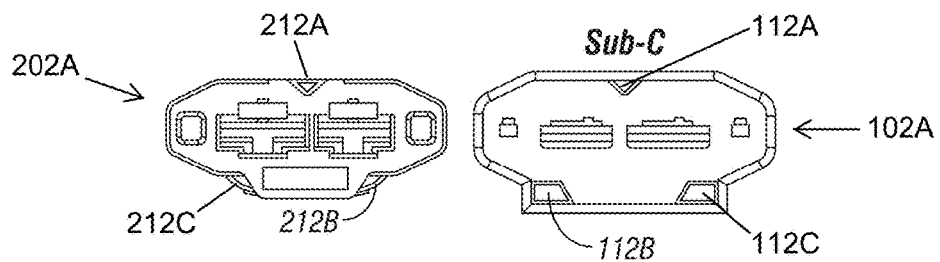
FIGS. 9-12 are front views showing several embodiments of male and female keying features.

As shown in FIG. 9, for example, the first male extended portion 102A configuration may comprise of the keying features 112A-C which may allow electrical connection with a female connector 200 implemented with the first female extended portion 202A configuration. The first female extended portion 202A configuration may be implemented with the keying features 212A-C which may correspond with the keying features 112A-C of the first male extended portion 102A. In an embodiment, the first male extended portion 102A may be implemented on electrically powered devices compatible for use with only Sub-C batteries, for example. Correspondingly, the first female extended portion 202A configuration may be implemented only on Sub-C batteries such that only the correct battery and device pairing may be permitted by the keying features 112, 212 of the respective male and female connectors 100, 200. All other battery chemistries and/or cell counts, such as 2/3A, LiPo and Legacy type connectors, may be prevented from electrically connecting with electrically powered devices configured with the first male extended portion 102A and compatible for use with only Sub-C batteries.

According to the embodiment of FIG. 9, the first male extended portion 102A may comprise a first male keying feature 112A, a second male keying feature 112B, and a third male keying feature 112C. The first male keying feature 112A may comprise a ridge protruding to within the socket formed by the first male extended portion 102A. The first male keying feature 112A may comprise a substantially triangularly prismatic shape, having a triangular cross section as viewed from the perspective of FIG. 9. The first male keying feature 112A and may extend along at least a portion of the length of male extended portion 102 along a direction substantially aligned with the direction of insertion of the female extended portion 202A to within the first male extended portion 102A. The first male keying feature 112A may comprise a portion of the leading edge of the male housing 100A, B Additionally, as shown, the first male keying feature 112A may be disposed along a surface of the socket or shroud formed by the first male extended portion 102A facing substantially toward the male terminals 104, 116. The first male keying feature 112A may comprise one or more internal surfaces of the socket or shroud formed. Further, as shown, the first male keying feature may be disposed along an inner surface of the socket or shroud formed by the first male extended portion 102A whereby the contact surfaces of the male power terminals 104A, B face substantially away from the inner surface of the socket or shroud on which the first male keying feature 112A is disposed. As shown, the first male keying feature 112A may be disposed at a midpoint location along an inner surface of the socket or shroud formed by the first male extended portion 102A, with at least a portion of the first male keying feature 112A disposed between the respective male power terminals 104A, B as viewed from a top-down perspective similar to that of FIGS. 7A-7C.

In alternative embodiments, the first male keying feature 112A may comprise a different cross sectional shape or relative location than that shown. For example, in alternative embodiments, the first male keying feature 112A may comprise a semi-circular, rectangular, notched, or other similar shape. Further, in alternative embodiments, the first male keying feature may be disposed along another inner surface of the socket or shroud formed by the first male extended portion 102A, or at a different location on the same surface as described above. In any embodiment, however, the first male keying feature 112A may be configured to aid in preventing electrical connection with a female connector 200 implemented with one or more other female extended portion 202 configurations, such as the fourth female extended portion 202D configuration. Further, the first male keying feature 112A may prevent reverse polarity electrical connection with a female connector 200 implemented with a different female extended housing configuration, such as the female extended portions 202B-D, for example.

The second male keying feature 112B may comprise a notch protruding to within the cross sectional area of the socket formed by the first male extended portion 102A. The second male keying feature 112B may comprise a substantially irregular trapezoidal shape when viewed from the front, as shown in FIG. 9. The second male keying feature 112B may be disposed substantially at the leading edge of the male housing 100A, B Further, as shown, the second male keying feature 112B may be oriented to face in a direction substantially normal to the direction of insertion of the first female extended portion 202A to within the first male extended portion 102A. Additionally, as shown, the second male keying feature 112B may be disposed substantially at an internal corner of the socket or shroud formed by the first male extended portion 102A. Further, as shown, the second male keying feature 112B may be disposed such that the contact surfaces of the male power terminals 104A, B face substantially toward the second male keying feature 112B. More specifically, in an embodiment, the second male keying feature 112B may be disposed such that the second male keying feature 112B may be directly across from at least a portion of a male power terminal 104A or 104B, as viewed from a top-down perspective similar to that of FIGS. 7A-7C.

In alternative embodiments, the second male keying feature 112B may comprise a different cross sectional shape or relative location than shown. For example, in alternative embodiments, the second male keying feature 112B may comprise a semi-circular, rectangular, triangular, or other similar shape. Further, in alternative embodiments, the second male keying feature 112B may be disposed at the leading edge of the male housing 100A, B along another inner surface of the socket or shroud formed by the first male extended portion 102A, or, alternatively, at a different location along one of the internal surfaces, such as away from a corner of the socket or shroud formed. In any embodiment, however, the second male keying feature 112B may be configured to aid in preventing electrical connection with a female connector 200 implemented with other female extended portion 202 configurations, such as the female extended portion 202B configuration, for example.

The third male keying feature 112C may comprise one or more features, functions, or characteristics as those of the second male keying feature 112B. In an embodiment, the third male keying feature 112C may comprise a substantially identical notch protrusion to the second male keying feature 112B, with the third male keying feature 112C disposed at a corner of the socket or shroud formed by the male extended portion 102A opposite the second male keying feature 112B and along the same side of the socket or shroud formed by the first male extended portion 102A, relative to the male power terminals 104A, B, as the second male keying feature 112B. More specifically, in an embodiment, the third male keying feature 112C may be disposed such that the third male keying feature 112C may be directly across from at least a portion of the opposite a male power terminal 104A or 104B, as viewed from a top-down perspective similar to that of FIGS. 7A-7C, than that of the second male keying feature 112B.

In alternative embodiments, the third male keying feature 112C may comprise different cross sectional shapes or relative locations in manners similar to those of the alternative embodiments of the second male keying feature 112B. In any embodiment, however, the third male keying feature 112C may be configured to aid in preventing electrical connection with a female connector 200 implemented with one or more other female extended portion 202 configurations, such as the third female extended portion 202C configuration, for example. The first male extended portion 102A configuration may, therefore, be implemented with keying features, as described which may permit only a female connector 200 comprising a first female extended portion 202A to be inserted within the first male extended portion 102A, preventing electrical connection with female connectors 200 comprising other female extended portion configurations, such as the female extended portions 202B-D, for example.

As shown in FIG. 9, the first female extended portion 202A may be configured for compatibility with the Sub-C first male extended portion 102A. The first female extended portion 202A may comprise a first female keying feature 212A, a second female keying feature 212B, and a third female keying feature 212C. As shown in the embodiment of FIG. 9, since each male keying feature 112A-C comprises a protruding portion extending to within the socket area formed by the first male extended portion 102A, the corresponding female keying features 212A-C may each comprise a cutout portion disposed along an external surface of the first female extended portion 202A configured to allow the first female extended portion 202A to fit within the first male extended portion 102A.

The first female keying feature 212A may comprise a groove extending into an outer surface of the plug formed by the first female extended portion 202A. The first female keying feature 212A may comprise a substantially triangularly prismatic shape, having a triangular cross section as viewed from the perspective of FIG. 9. The first female keying feature 212A may extend along at least a portion of the length of first female extended portion 202A along a direction substantially aligned with the direction of insertion of the first female extended portion 202A to within the first male extended portion 102A. The first female keying feature 212A may be disposed substantially at the leading surface of the female housing 201. Additionally, as shown, the first female keying feature 212A may be disposed along an externally facing surface of the plug formed by the first female extended portion 202A, facing substantially away from the female power terminals 204. The first female keying feature 212A may comprise one or more external surfaces of the plug formed. Further, as shown, the first female keying feature 212A may be disposed along an outer surface of the plug formed by the first female extended portion 202A whereby the contact surfaces of the female power terminals 204A, B face substantially toward the first female keying feature 212A. As shown, the first female keying feature 212A may be disposed at a midpoint location along an outer surface of the plug formed by the first female extended portion 202A, with at least a portion of the first female keying feature 212A disposed between the respective female power terminals 204A, B when viewed from a top-down perspective similar to that of FIGS. 7A-7C.

The second female keying feature 212B may comprise a cutout portion disposed along an outer corner of the first female extended portion 202A. The second female keying feature 212B may be disposed substantially at the leading surface of the female housing 201. Additionally, as shown, the second female keying feature 112B may be disposed substantially at an external corner of the female plug formed by the first female extended portion 202A. According to the embodiment of FIG. 9, the second female keying feature 212B may, therefore, comprise a shape and location configured to allow for the plug formed by the first female extension portion 202A to be inserted within the socket of the first male extended portion 102A without interference with the second male keying feature 112B during insertion.

The third female keying feature 212C may comprise one or more features, functions, or characteristics as those of the second female keying feature 212B. In an embodiment, the third female keying feature 212C may comprise a substantially identically shaped cutout portion as the second female keying feature 212B, with the third female keying feature 212C disposed at a location for allowing the female plug formed by the first female extended portion 202A to be inserted within the male extended portion 102A without interference with the third male keying feature 112C.

In alternative embodiments, each of the female keying features 212A-C may comprise a different shape and/or position than shown in FIG. 9. In such alternative embodiments, one or more of the female keying features 212A-C may comprise a shape and/or size differing from those shown in a manner consistent with a corresponding alternative embodiment of one or more respective male keying features 112A-C, in accordance with the alternative embodiments of the male keying features 112A-C described above. In any embodiment, therefore, the female keying features 212A-C of the first female extended portion 202A may be expected to comprise configurations allowing for insertion of the first female extended portion 202A within the first male extended portion 102A.

Figure 10:
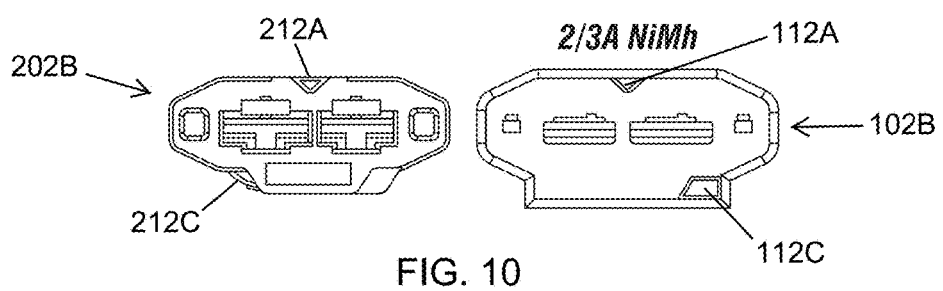

Referring now to FIG. 10, the second male extended portion 102B may comprise the first male keying feature 112A and the third male keying feature 112C. The second male extended portion 102B may be configured for use with 2/3A NiMH chemistry batteries. As shown, the first male keying feature 112A and the third male keying feature 112C may each comprise substantially the same respective features, functions, and characteristics as described above, in reference to FIG. 9. The second male extended portion 102B may, therefore, be implemented with keying features which may permit only a female connector 200 comprising the second female extended portion 202B to be inserted within the second male extended portion 102B, preventing electrical connection with female connectors 200 comprising other female extended portion configurations, such as the female extended portions 202A, C, or D, for example.

As shown in FIG. 10, the second female extended portion 202B may be configured with corresponding keying features compatible with the second male extended portion 102B. As such, in an embodiment, the second female extended portion 202B may be implemented on only 2/3A NiMH batteries. As shown, the second female extended portion 202B may comprise the first female keying feature 212A as well as the third female keying feature 212C. Each of the first female keying feature 212A and the third female keying feature 212C may be configured substantially as described above, in reference to FIG. 9.

In alternative embodiments, each of the first female keying feature 212A and the third female keying feature 212C may comprise a different shape and/or position than shown in FIG. 10. In such alternative embodiments, one or both of the first female keying feature 212A and the third female keying feature 212C may comprise a shape and/or size differing from those shown in a manner consistent with a corresponding alternative embodiment of one or both of respective male keying features 112A and 112C, in accordance with the alternative embodiments described above in reference to FIG. 9. In any embodiment, therefore, the second female extended portion 202B may be expected to comprise a keying feature configuration allowing for insertion of the second female extended portion 202B within the second male extended portion 102B.

Figure 11:
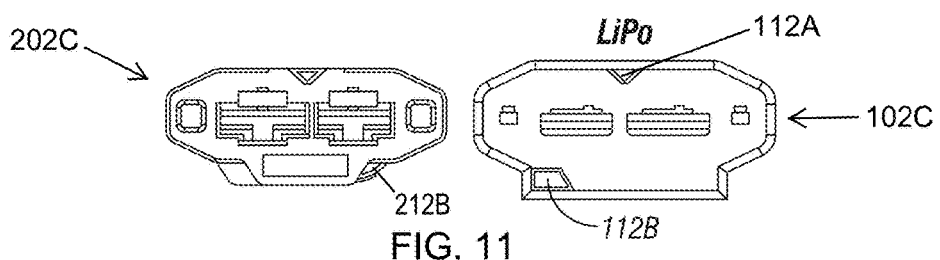

Referring now to FIG. 11, the third male extended portion 102C may comprise the first male keying feature 112A and the second male keying feature 112B. In an embodiment, the third male extended portion 102C may be implemented with devices suitable for use with LiPo chemistry batteries. As shown, both the first and second male keying features 112A, B may comprise substantially the same features, functions, and characteristics as described above in reference to FIG. 9. The third male extended portion 102C configuration may, therefore, be implemented with keying features which may permit only a female connector 200 comprising a female extended portion 202C to be inserted within the male extended portion 102C, preventing electrical connection with female connectors 200 comprising any of the other female extended portions 202A, B, or D.

As shown in FIG. 11, the third female extended portion 202C may be configured with corresponding keying features compatible with the third male extended portion 102C. As such, in an embodiment, the third female extended portion 202C may be implemented on only LiPo batteries. As shown, the third female extended portion 202C may comprise the first female keying feature 212A as well as the second female keying feature 212B. Each of the first female keying feature 212A and the second female keying feature 212B may be configured substantially as described above, in reference to FIG. 9.

In alternative embodiments, each of the first female keying feature 212A and the second female keying feature 212B may comprise a different shape and/or position than shown in FIG. 11. In such alternative embodiments, one or both of the first female keying feature 212A and the second female keying feature 212B may comprise a shape and/or size differing from those shown in a manner consistent with a corresponding alternative embodiment of one or both of respective male keying features 112A and 112B, in accordance with the alternative embodiments described above in reference to FIG. 9. In any embodiment, therefore, the third female extended portion 202C may be expected to comprise a keying feature configuration allowing for insertion of the third female extended portion 202C within the third male extended portion 102C.

Figure 12:
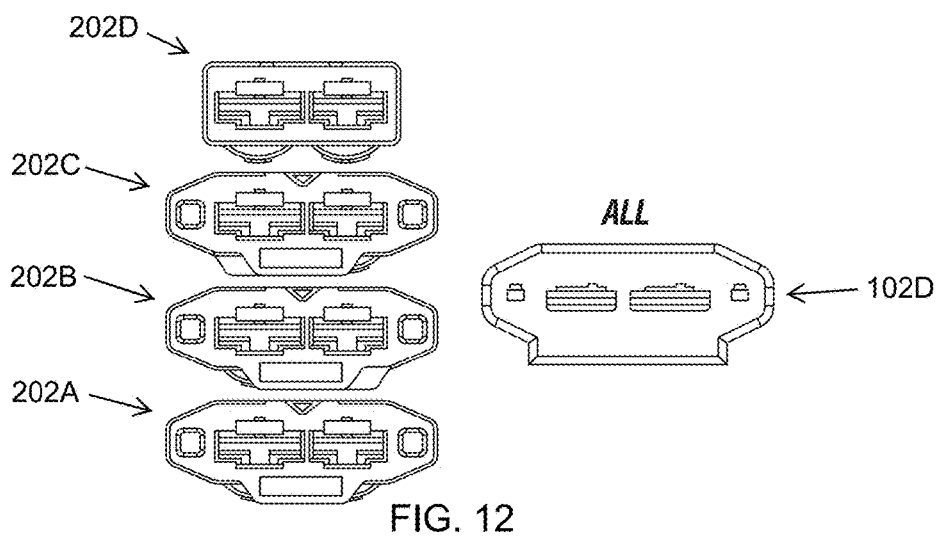

Referring now to FIG. 12, the fourth male extended portion 102D may comprise none of the male keying features 112A-C, as described above. The fourth male extended portion 102D may be configured for "universal" compatibility, allowing for electrical connections to be made with female connectors 200 comprising any of the female extended portions 202A-C, described above, as well as the fourth female extended portion 202D. As shown in FIG. 12, the fourth female extended portion 202D may comprise no female keying features 212A-C. The fourth female extended portion 202D may comprise a substantially rectangular outer cross sectional shape at its leading surface. According to the embodiment shown, the fourth female extended portion 202D may be configured for compatibility with the fourth male extended portion 102D.

Figure 24:
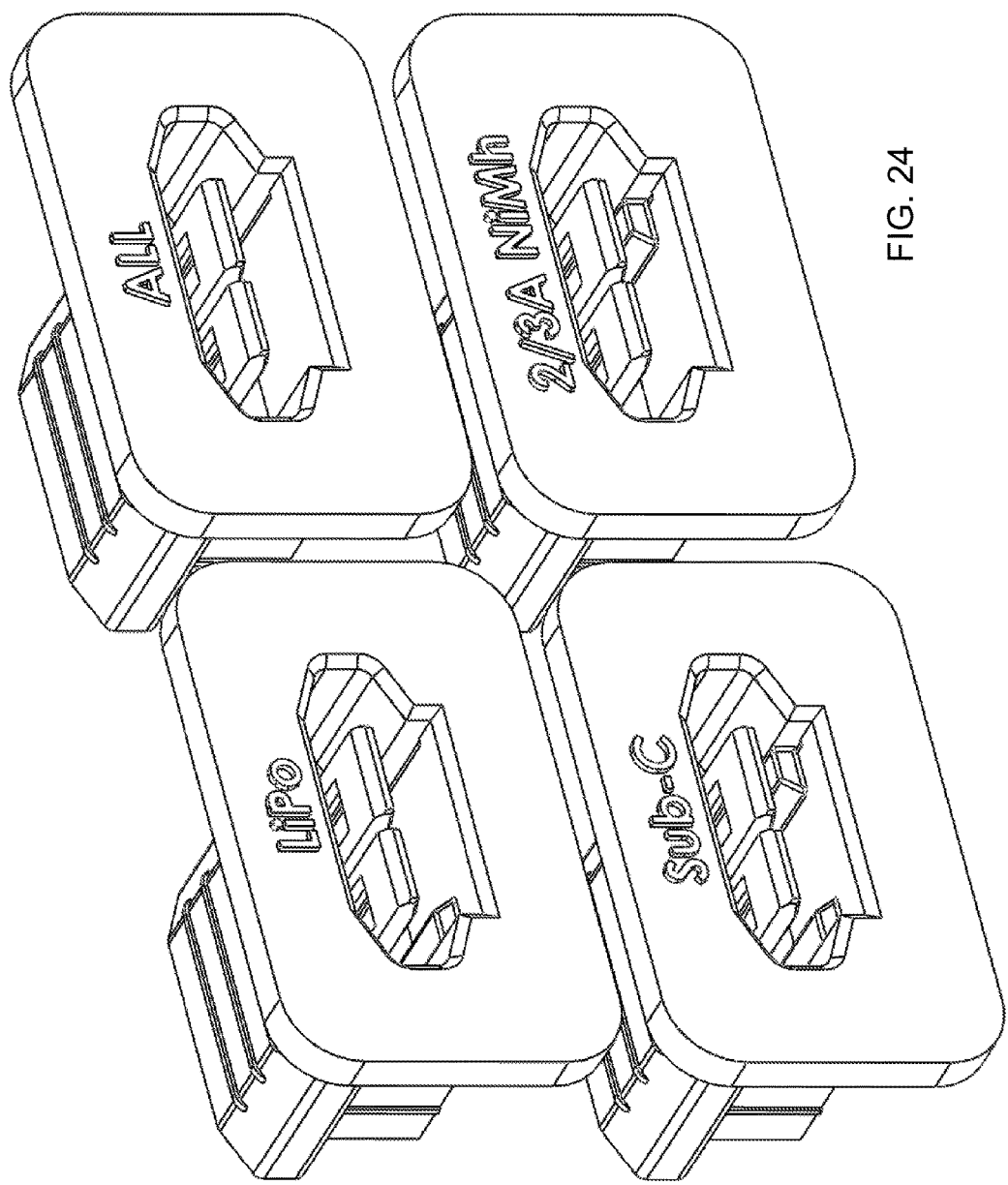
FIGS. 24 and 25 are several perspective views showing several embodiments of male keying features.
Figure 25:
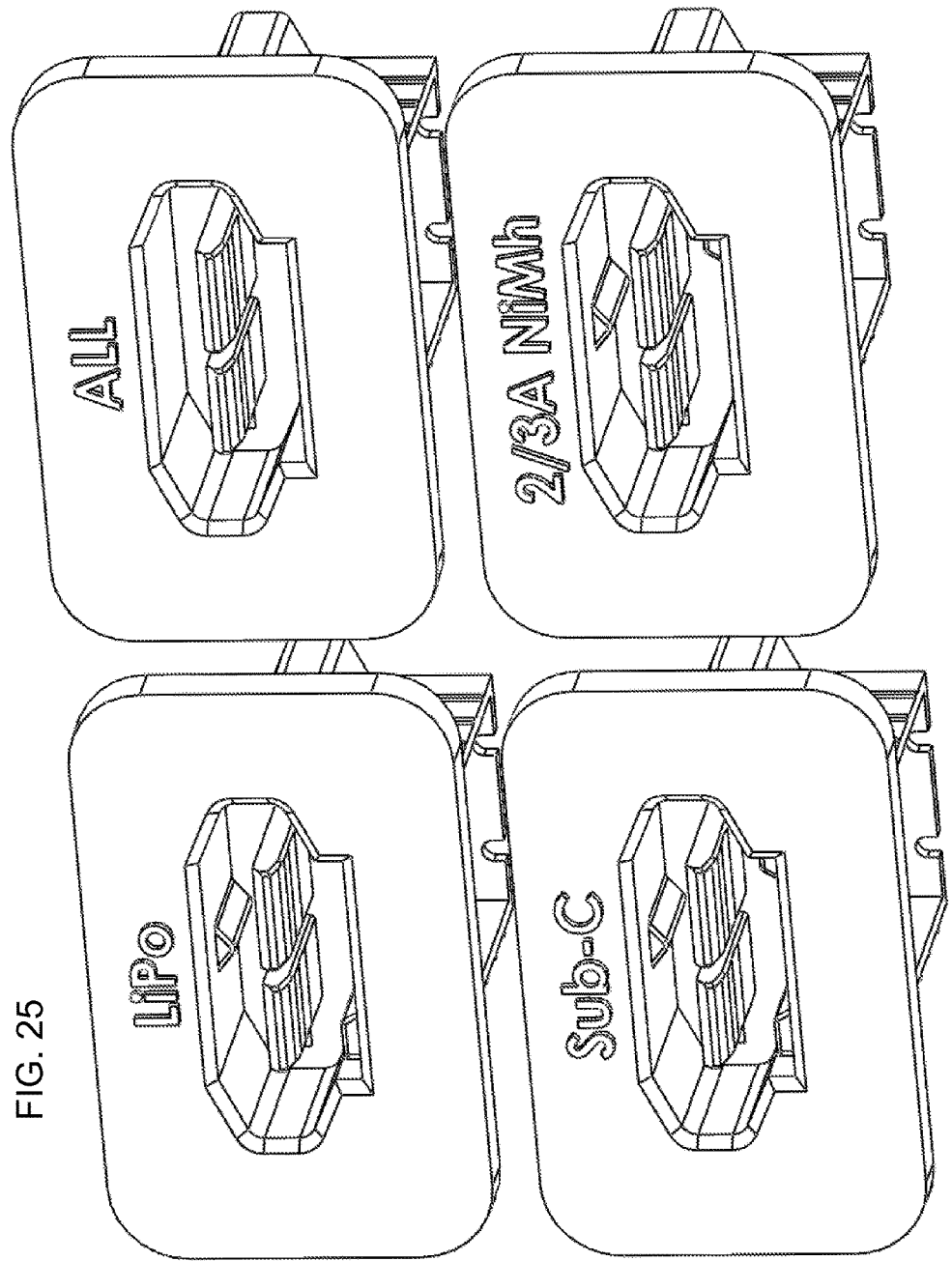

Referring briefly to FIGS. 24 and 25, several additional views showing various keying features of embodiments of the male connector 100 are shown. The keying features shown in FIGS. 24 and 25 correspond to the keying features shown in FIGS. 9-12, discussed above. The views shown in FIGS. 24 and 25 are not specifically discussed, here, to avoid inclusion of unnecessary or redundant language within this specification. The views of FIGS. 24 and 25 are provided for the purpose of more clearly showing aspects of the several male keying features described above.

Implementation of RFID Components within the Connectors

Referring to FIG. 1B, the male connector 100B is shown. The male connector 100B may comprise one or more components having similar features, functions, and characteristics of corresponding components of the male connector 100A, shown in FIG. 1A and described above. The male connector 100B may comprise additional features, functions, and characteristics, as described below, beyond those of the embodiment of the male connector 100A shown in FIG. 1A. For the purpose of eliminating unnecessary and redundant language, description of such components is made via reference to the description of corresponding components provided above.

According to the embodiment shown, the male connector 100B may comprise of additional components including the male communication device 106, a pair of communication wires 107A, B, a male communication device receptacle 110, and a male cover 111. In an embodiment, the male connector 100B may be an external electrical connector of an electrically powered device, such as an ESC or battery charger. The male connector 100B may include the male communication device 106 for communicating with a corresponding female communication device 206 which may be implemented within the female connector 200. The male communication device 106 may allow for wired or wireless communication across the respective male and female connectors 100, 200.

In an embodiment, the male communication device 106 may be disposed such that communication with the female communication device 206 is enabled at all times when the male connector 100B and the female connector 200, respectively, are electrically coupled to one another, as discussed below. The male communication device 106 may comprise an internal component of the male connector 100B, disposed within the male communication device receptacle 110 of the male housing 101B. The male communication device receptacle 110 may be disposed along a top surface of the male housing 101B, as shown, and enclose an area for housing the male communication device 106. In an embodiment, the male communication device receptacle 110 may span substantially the entire area of the male housing 101B, as viewed from above. In alternative embodiments, the male communication device receptacle 110 may span an area of less than the entire area of the male housing 101B, as viewed from the top, while still extending over at least a portion of the male raised portion 103.

The male communication device 106 may be disposed within the male communication device receptacle 110 such that at least a portion of the male communication device 106 may be disposed directly above the socket or shroud formed by the male extended portion 102. The male connector 100B may include the male cover 111 configured to fit over the male communication device receptacle 110 to enclose the male communication device 106 within. In such an embodiment, the male communication device 106 may be protected from being contacted by components or objects external to the male communication device receptacle 110. In an alternative embodiment, the male connector 100B may be an integral component of an electrically powered device, such as the electrically powered device 1000 of FIG. 2. In such alternative embodiments, the male cover 111 may not be provided. In such instances, the housing of the electrically powered device may function to enclose and protect the male communication device 106.

The male communication device 106 may comprise a single component or, alternatively, may comprise two or more components. In an embodiment, the male communication device 106 may comprise an RFID reader, a bar code scanner, a contactor switch, or other similar component suitable for enabling wired or wireless communication with a corresponding female communication device 206. Alternatively, in an embodiment, the male communication device 106 may comprise more than one component which may include one or more of the above listed components as well as, perhaps, an antenna, a processor, a memory, or a signal switching component, a power source, or the like.

The male communication device 106 may directly or indirectly electrically connect to one or more internal components of an electrically powered device, such as a controller of an ESC or battery charger, for example, via the communication wires 107A, B. In an embodiment, the communication wires 107A, B may be low current capacity signal wires having similar characteristics to those of the male signal wires 109A, B, discussed above. Alternatively, the male communication device 106 may directly or indirectly electrically connect to one or more internal components of an electrically powered device via a wireless connection. In such alternative embodiments, the communication wires 107A, B may not be provided or, alternatively, may function to transmit one or more power signals for powering the male communication device 106. According each embodiment described, the male communication device 106 may be directly or indirectly electrically connected via wired or wireless connections with one or more internal components of an electrically powered device. Further, for each of the embodiments described, the male communication device 106 may be expected to generate one or more signals comprising some or all of the information which may be received, sensed, or detected by the male communication device 106. The one or more signals generated by the male communication device may be directly or indirectly, to one or more internal components of an electrically powered device to which the male connector 100A, B may be electrically connected.

Referring to FIGS. 13-15, an embodiment of the male connector 100 is shown in phantom view in various positions relative to an embodiment of the female connector 200A. The male connector 100 shown may comprise an embodiment of the male connector 100B. The embodiment of the male connector 100 shown may comprise the male communication device 106 which may be an RFID reader. In such an embodiment, the male communication device 106 may comprise an antenna for transmitting and receiving one or more signals. The RFID reader comprising the male communication device 106 may generate an electromagnetic field for use in the wireless reception of data from a corresponding RFID component, such as an RFID tag or chip. In an embodiment, the male communication device 106 may be powered via an electrical connection with the electrically powered device to which it is electrically connected for generating the electromagnetic field. In alternative embodiments, the male communication device 106 may be powered by a separate power source which may be disposed within the male connector 100B.

The male communication device 106 may be capable of receiving data from an RFID tag or chip which is disposed within a "read range" of the male communication device 106. Those skilled in the art will understand that the area comprising the "read range" of an RFID reader may be dependent upon at least the location, orientation, and size of the antenna comprising the RFID reader. As such, the "read range" of a particular RFID reader may be configured to extend within only a desired distance of the RFID reader location. For example, the male communication device 106 may be configured to establish communication with an RFID tag or chip only at times while the RFID tag or chip is disposed at a desired location, or locations, relative to the male connector 100B.

According to FIGS. 13-15, the male communication device 106 comprising an RFID reader may be disposed within male housing 100A, B of an embodiment of the male connector 100. Further, the antenna of the male communication device 106 comprising an RFID reader may be configured to transmit and receive signals within the area comprising the socket or shroud formed by the male extended portion 102. The male communication device 106 may be configured for close-range, or "Nano-field" reading, whereby only RFID tags or chips within a very close proximity to the male communication device may be "read." In an embodiment, the male communication device 106 may comprise a "read range" of less than one quarter inch (6.35 mm), for example. Advantageously, according to such an embodiment, and with the male communication device 106 disposed as shown in FIGS. 13-15, only an RFID tag or chip disposed within the socket or shroud formed by the male extended portion 102 may be "read" by the male communication device 106. In another embodiment, the male communication device 106 may be configured to have a greater "read range."

Referring, now, to FIGS. 3A-3C and 13-15, the female connector 200 may include the female communication device 206 which may store information comprising one or more identifiers or parameter settings for the device, which may be a rechargeable battery, to which the female connector is electrically connected. The female communication device 206 may be disposed within the female housing 201, such as within the female communication device receptacle 207 (shown in FIGS. 3A-3C) of the female housing 201. According to such embodiments, the female communication device 206 may be disposed within the plug portion of the female connector 200 formed by the female extended portion 202.

Referring to FIG. 3A, the first female connector 200A is shown. The first female connector 200A may comprise the female housing 201, as described hereinbefore. The female housing 201 may have an elevated structure on a top side of the first female connector 200A and adjacent to a leading surface of the female extended portion 202B. The elevated structure may comprise the female communication device receptacle 207 for receiving and at least partially enclosing the female communication device 206. In an embodiment, the female communication device receptacle 207 may comprise an opening within the female extended portion 202B forming a cavity within which the female communication device 206 may be partially enclosed. The opening comprising the female communication device receptacle 207 may be disposed at a leading surface of the female extended portion 202B which may also comprise the plurality of openings of the female power terminal and balance terminal receptacles 204, 216 through which the male power terminals 104 and male balance terminals 116, respectively, of the male connector 100B may be received. In such an embodiment, the female communication device receptacle 207 may be disposed within the plug portion of the female extended portion 202B and may be configured to be insertable within the male raised portion 103 of the male connector 100B (shown best in FIGS. 1A and 1B). The female connectors 200 of FIGS. 3B and 3C may comprise similar features, functions, and characteristics as described herein, relative to FIG. 3A.

In alternative embodiments, the female communication device 206 may be disposed along an outer surface of the female housing 201. For example, in an embodiment, the female communication device may couple to an outer surface of the female extended portion 202. According to any of the embodiments described herein and below, the female communication device 206 of a female connector 200 may be expected to be disposed at a location suitable for communicating with the male communication device 106 of a male connector 100B at all times when an electrical connection is made between the respective male and female connectors 100B, 200.

In an embodiment, the female communication device 206 may comprise a single component or, alternatively, may comprise two or more components. In an embodiment, the female communication device 106 may comprise an RFID tag or chip, a bar code, a component configured to engage a switching device, or other similar component suitable for enabling wired or wireless communication with a corresponding male communication device 106 of a male connector 100B. Alternatively, in an embodiment, the female communication device 206 may comprise more than one component which may include one or more of the above listed components as well as, perhaps, an antenna, a processor, a memory, or a signal switching component, a power source, or the like. The particular configuration of the female communication device 206, in an embodiment, may be dependent upon the particular configuration of the male communication device 106, whereby the female communication device 206 may be expected to comprise a component configuration suitable for communicating with a particular male communication device 106 with which the female communication device 206 is paired.

As shown in FIGS. 3 and 13-15, the female communication device 206 may comprise an RFID tag or chip. In such embodiments, the female communication device 206 may comprise an integrated circuit for storing and/or processing information, as well as an antenna for receiving and transmitting one or more signals. In an embodiment, the female communication device 206 comprising an RFID tag or chip may be implemented within a female connector 200 of a rechargeable battery. Such a female communication device 206 may be electrically unconnected to a power source, such as the rechargeable battery. In such an embodiment, the female communication device 206 may be a passive RFID tag or chip which may be powered by one or more signals received from an RFID reader device, such as the male communication device 106. The female communication device 206, according to such an embodiment, may be configured to transmit one or more signals comprising information stored within the RFID tag only when one or more signals are received from a male communication device 106.

In an alternative embodiment, the female communication device 206 comprising and RFID tag or chip may be implemented within a female connector 200 of a rechargeable battery and may be electrically connected to receive power from the battery or from a separate on-board battery within the RFID tag or chip. In such embodiments, the female communication device 206 may be an active or semi-active RFID tag or chip. The female communication device 206 according to such alternative embodiments may be powered by the battery and may periodically or continuously transmit one or more signals comprising information stored within the RFID tag.

According to either embodiment, the female communication device 206 may be expected to communicate with the male communication device 106 of the male connector 100B at all times while the female communication device 206 is within the "read range" of the male communication device 106. The female communication device 206 may communicate with male communication device 106 by transmitting one or more signals comprising some or all of the information stored by the female communication device 206.

Referring to the phantom views shown in FIGS. 13-15, an embodiment of the male connector 100 may be implemented as an external connector of an electrically powered device, such as an ESC or battery charger, and may include the male communication device 106 which may be an RFID reader. The male communication device 106 may be disposed at a location within the male extended portion 102 and configured to have a "read range" spanning the horizontal distance A and disposed within a vertical range extending within the shroud of the male connector 100. The female connector 200A shown may be implemented as an external connector of a rechargeable battery and may include the female communication device 206 which may be a passive RFID tag. The RFID tag comprising the female communication device 206 may be disposed within the horizontal area B and configured to be activated by RFID reader signals which are within the horizontal distance B. It is noted that the horizontal distances A and B are horizontally fixed relative to the respective communication device 106, 206 positions. Further, it is noted that the lines of FIGS. 13-15 defining the horizontal distances A and B are elongated for labeling purposes and, as drawn, may extend vertically into areas not within the "read range" of the RFID reader and the receiving range of the RFID tag.

According to the particular embodiment described, the male communication device 106 and female communication device 206 may not be in communication with one another when in the positions shown in FIG. 13 since the RFID tag is not disposed within the read range of the RFID sensor (there is no overlap of areas A and B). Importantly, when disposed relative to one another as shown in FIG. 13, no electrical connection is made between the embodiment of the male connector 100 and the female connector 200 since the male power terminal 104 is not in contact with the female power terminal 204. FIG. 13 may be described as depicting the male and female connectors 100, 200 in an unconnected configuration.

Turning now to FIG. 14, as the male and female connectors 100, 200 are pushed closer together, an electrical connection is made as the male and female power terminals 104, 204 may come into contact with one another at their respective contact surfaces. Importantly, the horizontal distances A' and B' now comprise overlapping distances. In the configuration of FIG. 14, therefore, the female communication device 206 and male communication device 106 may have established an RF connection whereby information stored within the female communication device 206 may be communicated to the male communication device 106. FIG. 14 may be described as depicting the male and female connectors 100, 200 in a partially inserted configuration.

Turning now to FIG. 15, the male and female connectors 100, 200 may be pushed as close together as possible. The electrical and RF connections made between the male and female connectors 100, 200 may remain intact with the respective male and female connectors 100, 200 in the configuration of FIG. 15. As shown, the male and female power terminals 104, 204 may continue to be into contact with one another at their respective contact surfaces while the horizontal distances A" and B" continue to comprise an overlapping distance. FIG. 15 may be described as depicting the male and female connectors 100, 200 in a fully inserted configuration. While in the partially inserted or fully inserted positions, the electrically powered device to which the embodiment of the male connector 100 is electrically connected may be operated to charge or discharge the battery to which the female connector 200A is electrically connected. Further, the electrically powered device to which the embodiment of the male connector 100 is electrically connected may be configured to operate in accordance with one or more parameter settings which may be set, modified, or defined using information communicated via the RF connection at the communication devices 106, 206.

While the male and female connectors 100, 200 translate between the partially and fully inserted positions, the RF connection between the male and female communication devices 106, 206 may be maintained since the respective devices may remain within the respective read ranges of one another. In an embodiment, therefore, there may be no location of the connectors 100, 200, relative to one another, at which and electrical connection may be made at one or more of the respective power terminals 104, 204 and/or balance terminals 116, 216 (not shown) without the communication devices 106, 206 being disposed at locations, relative to one another, at which a wireless connection may be made between the communication devices 106, 206. When configured in the manner shown, improper charging or discharging operation of the battery may be prevented since information stored within the RFID tag of the battery may be communicated to the electrically powered device at any time that an electrical connection for charging or discharging the battery is made.

In an embodiment, the electrically powered device implemented with the embodiment of the male connector 100 shown in FIGS. 13-15 may attempt to establish an RF connection at the male communication device 106 before an electrical connection is made at the male connector 100. Alternatively, the electrically powered device implemented with the embodiment of the male connector 100 shown in FIGS. 13-15 may attempt to establish an RF connection at the male communication device 106 after an electrical connection is made at the male connector 100. Either way, the female communication device 206 can be expected to be within range of the male communication device 106 for establishing communication at any time that an electrical connection is made at the male power terminal 104. At this point, the electrically powered device may be enabled to operate to charge or discharge the battery via the electrical connections at the connectors 100, 200.

In an embodiment, the male communication device 106 may only read the female communication device 206 when the male and female connectors 100, 200, respectively, are being coupled and the female communication device 206 is enclosed within the female housing 201, and may continue to read while the connectors 100, 200 are electrically connected via one or more terminals. In an alternative embodiment, the male communication device 106 may be configured to read the female communication device 206 located in other positions relative to the female connector 200, such as being mounted on an exterior surface of the connector, for example, or any other suitable location.

Figure 26:
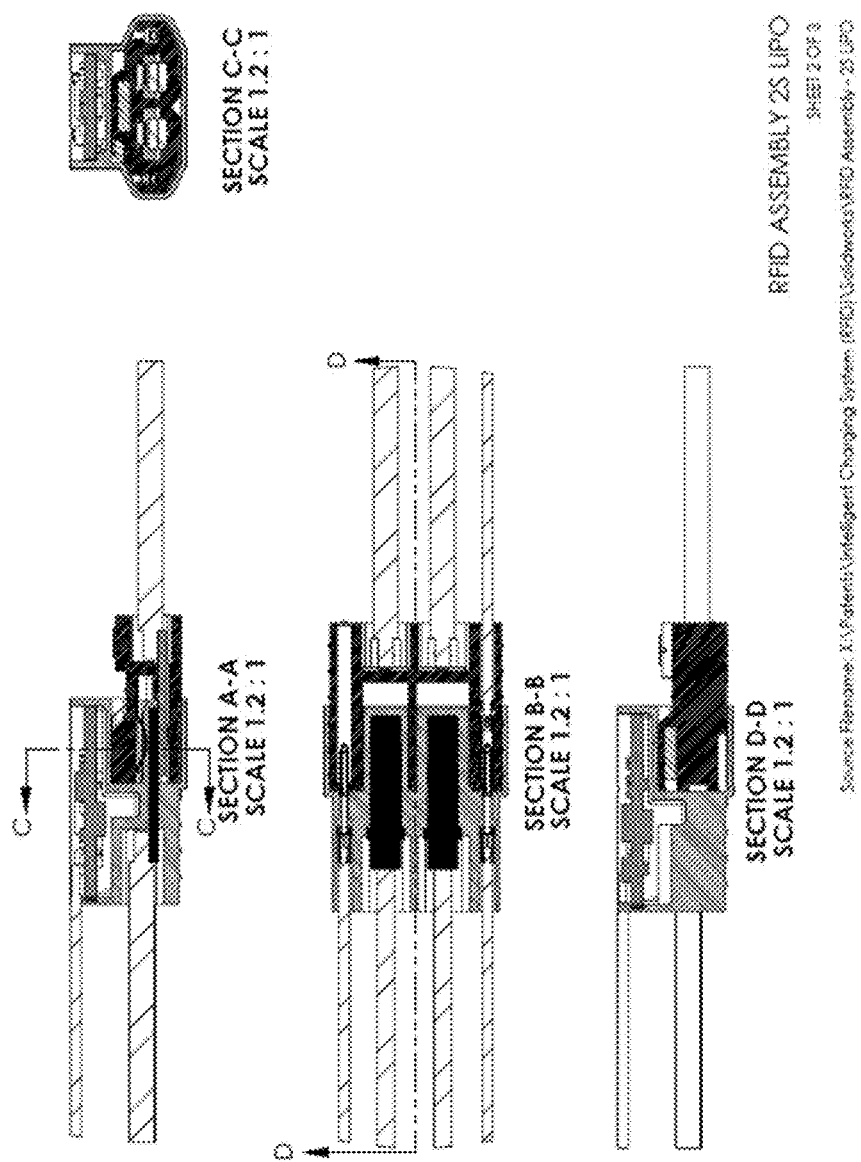
FIG. 26 is several cutaway views of an assembled male and female connector.
Figure 26:
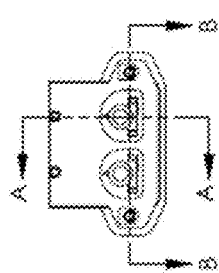
Figure 27:
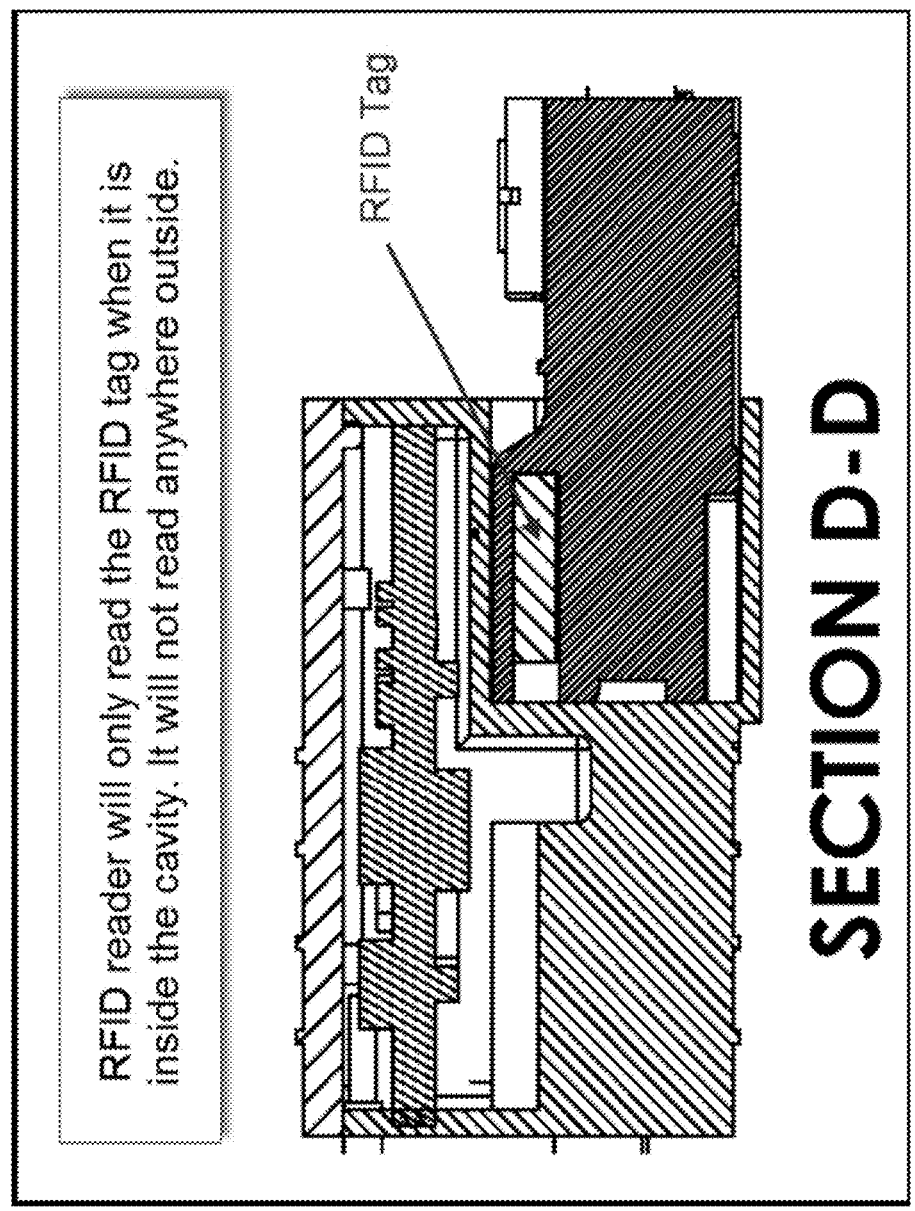
FIG. 27 is a cutaway view along line D-D of FIG. 26.
Figure 28:
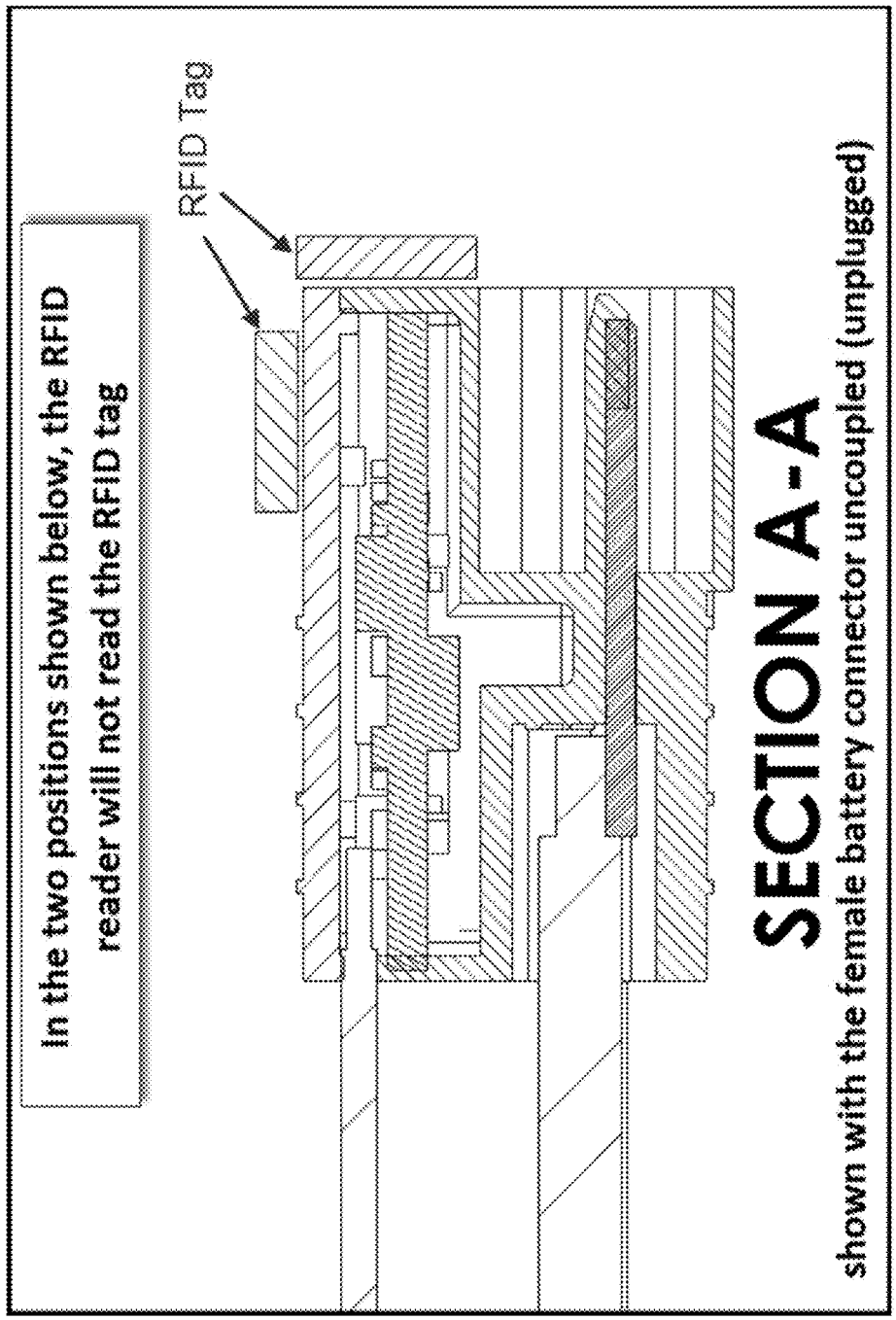
FIG. 28 is a cutaway view along line A-A of FIG. 26.

Referring briefly to FIGS. 26-28, several additional views showing embodiments of the male connector 100B and the female connector 200 in connected configurations are shown. The embodiments of the male connector 100B and the female connector 200 in connected configurations shown in FIGS. 26-28 correspond to the various features, functions, and characteristics shown in FIGS. 1A, 1B, 3A-3C, 7A-7C, 8B, and 13-15, discussed above. FIGS. 26-28 are not specifically discussed, here, to avoid inclusion of unnecessary or redundant language within this specification. FIGS. 26-28 are provided for the purpose of more clearly showing several of the features, functions, and characteristics of the male and female connectors 100, 200.

Automatic Detection of Battery Type

Figure 16:
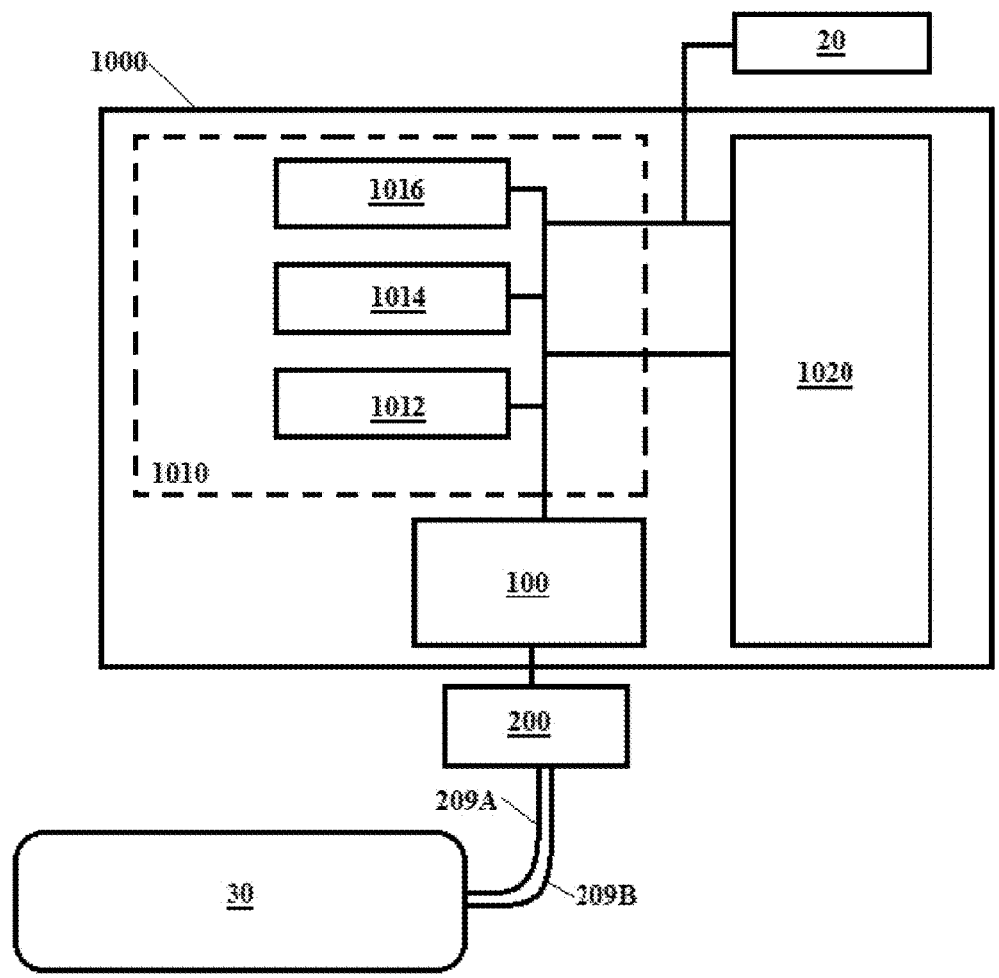
FIG. 16 is a block diagram of an embodiment of an electrically powered device with a connection port comprising an embodiment of a male connector and electrically connected to a battery.

Referring to FIG. 16, an electrically powered device is shown. In an embodiment, the electrically powered device may comprise an ESC 1000 which may be implemented within a battery powered model vehicle. The ESC 1000 may comprise one or more controls components of a battery powered model vehicle, providing an electronically generated single or multi-phase electric power voltage source of energy to one or more powered components of the battery powered device. In an embodiment, the ESC 1000 may be a standalone component within the model vehicle which may electrically connect with one or more additional control components of the model vehicle, such as a receiver of a radio controlled model vehicle, for example. In alternative embodiments, the ESC 1000 may be a component within a receiver of a radio controlled model vehicle.

According to the embodiment of FIG. 16, the ESC 1000 may comprise a controller 1010, a signal generator circuit 1020, and the male connector 100, which may comprise any embodiment of the male connectors 100 described above. In alternative embodiments, the ESC 1000 may comprise of additional, fewer, or different components than those shown in FIG. 16. As shown in FIG. 16, the ESC 1000 may electrically connect to the battery 30 via the male connector 100. The ESC 1000 may, additionally, be electrically connected to a powered component 20 of the model vehicle, which may be a motor, servo, or the like.

The ESC 1000 may receive one or more power signals from the battery 30 when electrically connected to the battery 30 via the male connector 100, discharging the battery 30. The ESC 1000 may be compatible to connect with, and receive one or more signals from, a battery comprising any of several chemistry types, such as an NiMH chemistry or LiPo chemistry battery, for example. The ESC 1000 may be compatible to connect with a battery comprising any of several different cell counts, including, for example, a 2/3A NiMH battery, aSub-C NiMH battery, a LiPo battery of between 2S and 6S cell counts (or cell counts), and the like. The listed examples are intended to be illustrative only. In alternative embodiments, the ESC 1000 may be compatible for use with one or more batteries of different chemistries and/or cell counts than those listed above. Specifics regarding each battery chemistry and cell counts are omitted from this description as such details are not considered necessary to obtain a complete understanding of the apparatuses and methods described herein, and are considered to be within the understanding of persons of ordinary skill in the relevant art.

In an embodiment, the ESC 1000 may generate one or more configurable control or power signals for controlling the powered component 20. According to the embodiment shown, the ESC 1000 may electrically connect with the powered component 20 via a wired connection. In alternative embodiments, the ESC 1000 may electrically connect with one or more powered components 20 via one or more wired or wireless connections. The ESC 1000 may transmit one or more control and/or power signals to the one or more components 20 for controlling operation of the one or more powered component 20. For example, the ESC 1000 may transmit one or more power and/or control signals to set or vary the speed of rotation of a motor, to set or vary the direction of rotation of a motor, to set or vary the position of a servo, and/or the like. In an embodiment, the ESC 1000 may transmit the one or more control and/or power signals to the one or more components 20 directly or indirectly, such as through one or more intermediary devices.

The ESC 1000 may include the controller 1010 for controlling, monitoring, protecting, and/or configuring operation of the ESC 1000. The controller 1010 may be implemented with control logic for selectively enabling, disabling, or reconfiguring operation of one or more of the ESC 1000 components. The controller 1010 may be electrically connected to other ESC 1000 components via wired or wireless connections. In an embodiment, the controller 1010 may be provided with one or more internal components, such as a memory 1012, a processor 1014, and/or an input/output (I/O) interface 1016. The memory 1012 may store computer executable instructions, operational parameters for system components, predefined tolerance values or ranges, and the like. The processor 1014 may execute instructions stored within the memory 1012. The I/O interface 1016 may operably connect the controller 1010 to one or more ESC 1000 components such as an embodiment of the male connector 100 and the signal generator circuit 1020, for example. The I/O interface 1016 may, additionally, operably connect the controller 1010 to one or more external components electrically connected to the ESC 1000, such as the battery 30 and the powered component 20, for example.

The controller 1010 may be provided with logic for monitoring and/or reconfiguring operation of the ESC 1000 as part of one or more protection and/or control methods. In an embodiment, the controller 1010 may detect one or more operating conditions of the ESC 1000 using one or more ESC 1000 components, such as the male connector 100, for example. In an embodiment, the controller 1010 may detect the existence of one or more electrical connections, or electrical opens, at the respective leads and/or terminals of the male connector 100, for example. In such an embodiment, the controller 1010 may detect an electrical connection at a terminal of the male connector 100 through detecting a received signal via the respective lead and/or terminal. Similarly, an electrical open may be detected by the controller 1010 detecting no received signal via a terminal of the male connector 100. The controller 1010 may, further, detect one or more conditions of the battery 30 electrically coupled to the ESC 1000 through sensing the respective voltages of one or more power signals received from the battery 30 via one or more terminals of the male connector 100.

Alternatively, the controller 1010 may detect one or more electrical connections, or electrical opens, at the respective terminals of the male connector 100 through transmission of one or more continuity check signals to the respective leads and/or terminals. The connection data detected by the controller 1010 may comprise one or more signals received from one or more remote devices, such as the battery 30, which may be received via one or more direct electrical connections with the female connector 200 of the battery 30. Alternatively, the controller 1010 may receive one or more signals indirectly from one or more remote devices, such as through one or more intermediate devices. The one or more intermediate devices may comprise signal converters, processors, input/output interfaces, amplifiers, conditioning circuits, connectors or adapters, and the like.

In an embodiment, the controller 1010 may use detected connections statuses and/or voltage data as input to one or more control methods for operation of the ESC 1000. In an embodiment, the controller 1010 operates the ESC 1000 in accordance with one or more operational modes in response to the one or more connection statuses detected. For example, the controller 1010 may vary the operational mode of the ESC 1010 in response to detection of one or more electrical connections at the male connector 100 indicating that a battery of a specific chemistry type, or of a particular charge capacity, is connected to the ESC 1000. Additionally, or alternatively, the controller 1010 may make comparisons between one or more sensed voltages of signals received via the leads and/or terminals of the connector to one or more threshold values. The controller 1010 may reconfigure aspects of the ESC 1000 operation in response to the outcomes of such comparisons. For example, the controller 1010 may reconfigure, or disable, operation of the signal generator circuit 1020 in response to determining one or more received signals comprises an out-of-tolerance voltage.

As shown in FIG. 16, in an embodiment, the ESC 1000 may include the signal generator circuit 1020. The signal generator circuit 1020 may be operated by the controller 1010 to generate one or more power and/or control signals transmitted by the ESC 1000 to one or more powered components 20. In an embodiment, the signal generator circuit 1020 may convert input power received from a power source, such as the battery 30, to one or more power and/or control signals in response to input received from the controller 1010. The signal generator circuit 1020 may be connected to the controller 1010 via a wired or wireless connection.

The ESC 1000 may comprise any embodiment of the male connector 100 described above for electrically connecting the ESC 1000 to the battery 30 which may be implemented with any corresponding embodiment of the female connector 200, as described above. It is noted that although typical embodiments of the connectors 100, 200 may include communication devices 106, 206, which may comprise RFID sensors and tags, respectively, such components may not be used in all of the ESC 1000 operations. Further, in certain embodiments, the connectors 100, 200 provided may not include the communication devices 106, 206. In such embodiments, as described herein, the ESC 1000 may determine one or more characteristics of the battery 30 using the detected signals at one or more balance terminals 116 of the male connector 100.

Referring to FIGS. 1A, 1B, 15, and 16, in an embodiment, the male power wires 108A, B of the male connector 100 may electrically connect with one or more internal components of the ESC 1000. The male power wires 108A, B may operatively electrically couple the male power terminals 104A, B of the male connector 100 to the controller 1010 and/or the signal generator circuit 1020 of the ESC 1000. In an embodiment, the male power terminals 104A, B may electrically connect the ESC 1000 to positive and negative electrical circuits, respectively, of the battery 30 while the battery 30 is electrically connected to the ESC 1000 via the male connector 100. The ESC 1000 may receive power from the battery 30 while the battery 30 is electrically connected to the ESC 1000 via the male power terminals 104A, B of the male connector 100, discharging the battery.

Referring to FIGS. 1A, 1B, 7B, 7C, and 16, in an embodiment, the male signal wires 109A, B of the male connector 100 may electrically connect with one or more internal components of the ESC 1000. The male signal wires 109A, B may operatively electrically couple the male balance terminals 116A, B of the male connector 100 to the controller 1010 and/or the signal generator circuit 1020. The male balance terminals 116A, B of the male connector 100 may electrically connect with the corresponding balance terminals 216 of the female connector 200 of the battery 30, if provided, when the connector 200 of the battery is electrically connected to the male connector 100. One or both male balance terminals 116A, B may receive one or more balance signals transmitted by the battery 30. In an embodiment, the reception of one or more balancing signals from the battery 30 may indicate one or more conditions of the battery 30, such as the battery chemistry, the charge capacity, the cell count, and/or other similar conditions of the battery 30, for example. Further, the respective voltage values of the one or more signals received via the one or more male balance terminals 116 may indicate one or more conditions of the battery 30, such as the remaining charge of the battery 30 and/or the remaining charge of one or more cells within the battery 30, for example.

Referring to FIG. 7A, the electrical connections made at the respective male balance terminals 116A, B when the first female connector 200A and an embodiment of the male terminal 100 are in the partially inserted or fully inserted position are shown. This may be a typical assembly of the male and female connector 100, 200 for electrically connecting the battery 30 comprising the NiMH chemistry to the ESC 1000. While the first female connector 200A is in the partially inserted or fully inserted position, the female power terminals 204A, B may electrically connect with the male power terminals 104A, B of the male connector 100. One or more power signals may be transmitted to the male power terminals 104A, B of the male connector 100 from the battery 30 via the female power terminals 204A, B. The ESC 1000 may receive the one or more power signals from the battery 30 electrically connected to the ESC 1000 via the male connector 100, discharging the battery 30.

Importantly, as shown in the embodiment of FIG. 7A, the first female connector 200A may include no female balance terminals 216 for making one or more electrical connections with the male balance terminals 116A, B of the male connector 100. No signal, or signals, therefore, may be received by the ESC 1000 via either of the male balance terminals 116A, B according to the embodiment shown. The controller 1010 may be configured to detect open connections at both of the male balance terminals 116A, B while one or more power signals may be received via the male power terminals 104A, B. The controller 1010 may be configured to identify the battery 30 electrically coupled to the male connector 100 via the first female connector 200A may comprise an NiMH chemistry battery. Additionally, or alternatively, the controller 1010 may be configured to identify the battery 30 electrically coupled to the male connector 100 via the first female connector 200A as a battery not configured for balance discharging operation based upon the detection of open connections at the respective balance terminals 116A, B. The controller 1010 may determine that open connections are present at the respective male balance terminals 116A, B in response to sensing no voltage or signal received via the male balance terminals 116A, B. The controller 1010 may be implemented with logic defining detection of open connections at all of the male balance terminals 116 provided within the connector 100 to indicate that the battery 30 comprises an NiMH chemistry battery.

Referring to FIG. 7B, the electrical connections made at the respective male balance terminals 116A, B when the second female connector 200B and an embodiment of the male connector 100 are in the partially inserted or fully inserted position are shown. This may be a typical assembly of embodiments of the male and female connectors 100, 200 for electrically connecting the battery 30 comprising the LiPo chemistry type and comprising two cells (2S) to the ESC 1000. While the second female connector 200B is in the partially inserted or fully inserted position, the female power terminals 204A, B may electrically connect with the male power terminals 104A, B of the male connector 100. One or more power signals may be transmitted to the male power terminals 104A, B of the male connector 100 from the battery 30 via the female power terminals 204A, B. The ESC 1000 may receive the one or more power signals from the battery 30 electrically connected to the ESC 1000 via the male connector 100, discharging the battery 30.

Importantly, as shown in the embodiment of FIG. 7B, the second female connector 200B may include the female balance terminal 216A for making an electrical connection with the male balance terminal 116A of the male connector 100. Further, the second female connector 200B may not include the female balance terminal 216B for making an electrical connection with the male balance terminal 116B. No signal, or signals, therefore, may be received by the ESC 1000 via the male balance terminal 116B while one or more signals may be received by the ESC 100 via the male balance terminal 116A. The controller 1010 may be configured to detect the electrical connection at the male balance terminal 116A and the open connection at the male balance terminal 116B at a time when one or more power signals may be received via the male power terminals 104A, B. The controller 1010 may be configured to identify the battery 30 electrically coupled to the male connector 100 via the second female connector 200B may comprise a two cell (2S) LiPo chemistry battery. Additionally, or alternatively, the controller 1010 may be configured to identify the battery 30 electrically coupled to the male connector 100 via the second female connector 200B as requiring balanced discharging operation. According to either embodiment, the controller 1010 may be configured to modify or set one or more operational parameters of the ESC 1000, such as setting a low voltage cutoff value appropriate for a 2S LiPo battery, based upon the electrical connections and open connections detected at the respective male balance terminals 116A, B. The low voltage cutoff value may define a minimum remaining charge of the battery 30, or of each cell of the battery 30, at which a discharging operation performed by the ESC 1000 may be terminated.

The controller 1010 may determine that an electrical connection is made at the male balance terminal 116A while no connection is made at the balance terminal 116B through sensing one or more signals comprising a non-zero voltage at the balance terminal 116A while no signal, or a zero voltage signal, is received via that male balance terminal 116B. The controller 1010 may be implemented with logic defining sensing reception of one or more balance signals via the male balance terminal 116A while a no voltage condition is sensed at the male balance terminal 116B to be indicative of the battery 30 being a 2S LiPo battery. Additionally, or alternatively, the ESC 1000 may sense one or more received signals comprising non-zero voltage values from the male balance terminal 116A and assume the battery 30 comprises a 2S LiPo chemistry battery based at least in part upon the magnitude of the voltage values being within a predefined range of appropriate voltage corresponding to a 2S LiPo chemistry battery. In such embodiments, the predefined range, or ranges, of voltage values may be stored within the memory of the controller 1010, Referring to FIG. 7C, the electrical connections made at the male balance terminals 116A, B when the third female connector 200C and the male connector 100 are in the partially inserted or fully inserted position are shown. This may be a typical assembly of an embodiment of the male and female connectors 100, 200 for electrically connecting a battery 30 comprising the LiPo battery chemistry type and, further, comprising three cells (3S) to the ESC 1000. While the second female connector 200C is in the partially inserted or fully inserted position, the female power terminals 204A, B may electrically connect with the male power terminals 104A, B of the male connector 100. One or more power signals may be transmitted to the male power terminals 104A, B of the male connector 100 from the battery 30 via the female power terminals 204A, B. The ESC 1000 may receive the one or more power signals from the battery 30 electrically connected to the ESC 1000 via the male connector 100, discharging the battery 30.

Importantly, as shown in the embodiment of FIG. 7C, the third female connector 200C may include the female balance terminals 216A, B for making electrical connections with the male balance terminals 116A, B, respectively, of the male connector 100. The controller 1010 may be configured to detect the electrical connections made at each of the male balance terminals 116A, B while when one or more power signals may be received via the male power terminals 104A, B. The controller 1010 may be configured to identify the battery 30 electrically coupled to the male connector 100 via the third female connector 200C as comprising a three cell (3S) LiPo chemistry battery. Additionally, or alternatively, the controller 1010 may be configured to identify the battery 30 electrically coupled to the male connector 100 via the third female connector 200C as requiring balanced discharging operation. According to either embodiment, the controller 1010 may be configured to modify or set one or more operational parameters of the ESC 1000, such as setting a low voltage cutoff value appropriate for a 3S LiPo battery, based upon the electrical connections sensed at the respective male balance terminals 116A, B.

The controller 1010 may determine that an electrical connection is made at the male balance terminals 116A and 116B through sensing one or more signals comprising non-zero voltages at each of the male balance terminals 116A,B. The controller 1010 may be implemented with logic defining detection of one or more respective balance signals via each of the male balance terminals 116A, B to indicate that the battery 30 comprises a 3S LiPo battery. Additionally, or alternatively, the ESC 1000 may sense one or more received signals comprising non-zero voltage values from the respective male balance terminals 116A, B and assume the battery 30 comprises a 3S LiPo chemistry battery based at least in part upon the magnitude of one or more of the voltage values received being within a predefined range of appropriate voltage corresponding to a 3S LiPo chemistry battery. In such embodiments, the predefined range, or ranges, of voltage values may be stored within the memory of the controller 1010. Referring to FIG. 16, in an alternative embodiment, the electrically powered device shown may comprise a battery charger 1000 for providing one or more configurable charge currents for charging the battery 30. An embodiment of the male connector 100 may be implemented as a connection port of a battery charger 1000. In an embodiment, the battery charger may comprise an internal component configuration similar to that described above, in reference to the ESC 1000, excepting that the signal generator circuit 1020 of the ESC 1000 may, instead, comprise one or more circuits for generating one or more charge currents for charging the battery 30. In an embodiment, the signal generator circuit 1020 may comprise components capable of generating charge currents accommodating any known charging operation commonly used for charging a battery comprising any of the chemistries and/or cell counts (or cell counts) described herein, and above.

When the male connector 100 is implemented within the battery charger 1000, the battery charger 1000 may identify the chemistry type and/or cell count of the battery 30 which may be electrically connected to the battery charger 1000 via the male connector 100 in a manner similar to that described above, in reference to the ESC 1000. The battery charger 1000 may be implemented with logic for automatically selecting one or more charge parameter settings, such as the charge mode, the charge current amperage value, based on battery chemistry type and/or cell count identified for the battery 30 via the electrical connections made, and signals received, at the respective male terminals 104, 116. For example, a limited number of charger settings may be selectable for charging the battery 30 if at least one balance signal is detected by the controller 1010. During charging operation, the battery charger 1000 may, further, use one or more electrical connections at the male balance terminals 116 to provide balanced charging operation of the individual cells comprising the battery 30 to bring them within a small percentage of each other in accordance with one or more known methods of balance charging a battery.

Referring to FIGS. 7A and 13-15, the battery charger 1000 may be electrically connected via the male connector 100 to the battery 30 implemented with the first female connector 200A. When connected to the battery 30, as shown in FIGS. 7A-7C and 13-15, the battery charger 1000 and the battery 30 may be electrically connected to one another via the respective male terminals 104, 116 as described above. The battery charger 1000 may detect the open connections at the male balance terminals 116A, B and may identify the battery 30 as comprising a NiMH chemistry battery.

The controller 1010 may set one or more parameters of the battery charger 1000, such as the charge mode or the charge rate, for example, to an appropriate setting or value for charging a NiMH battery in response to identifying the battery 30 as comprising a NiMH battery. For example, the battery charger 1000 may set the charge mode to fast charge, peak detection charge, trickle charge, or other known charging method suitable for charging a NiMH battery. In an embodiment, one or more charge mode or current settings may still need to be set, adjusted, or selected by a user following identification of the battery 30 and automatic configuration of one or more charge mode or charge current parameters by the controller 1010 of the battery charger 1000. A limited number of charge mode and/or charge current settings may be selectable by a user for charging operation of the battery 30 based upon the identified chemistry and/or cell count of the battery 30. In some embodiments, the male communication device 106, which may be an RFID reader, may be required to support full self-configuration of the battery charger 1000.

Referring to FIGS. 7B and 13-15, the battery charger 1000 may electrically connect via the male connector 100 to the battery 30 implemented with the second female connector 200B via the respective male terminals 104, 116 as described above. The battery charger 1000 may detect the electrical connections and opens made between the male connector 100 and the second female connector 200B and may identify the battery 30 as comprising a 2S LiPo battery. Additionally, or alternatively, the battery 30 may be identified through detection of one or more signal voltages within a predefined range received via the male balance terminals 116A, B.

The controller 1010 of the battery charger 1000 may set one or more charge mode or charge current parameters to a setting appropriate for charging a 7.4V 2S LiPo battery in response to identifying the battery 30 as comprising a 2S LiPo battery. For example, the controller 1010 may set the charge mode of the battery charger 1000 to balance charge the 2S LiPo battery. Additionally, or alternatively, the controller 1010 may set the charge rate of the battery charger 1000 by configuring the signal generator 1020 to generate a charge signal at an amperage suitable for charging a 2S LiPo battery. In an embodiment, one or more additional charge mode or current settings may still need to be set, adjusted, or selected by a user following identification of the battery 30 and automatic configuration of one or more charge mode or charge current parameters by the controller 1010 of the battery charger 1000. A limited number of charge mode and/or charge current settings may be selectable by a user for charging operation of the battery 30 identified as comprising a 2S LiPo battery. In some embodiments, the male communication device 106, which may be an RFID reader, may be required to support full self-configuration of all charge mode and/or charge current parameter settings of the battery charger 1000.

Referring to FIGS. 7C and 13-15, the battery charger 1000 may, likewise, be electrically connected via the male connector 100 to the battery 30 implemented with the third female connector 200C via the respective male terminals 104, 116A, B as described above. The battery charger 1000 may detect the electrical connections made between the male connector 100 and the third female connector 200C and may identify the battery 30 as comprising a 3S LiPo battery. Additionally, or alternatively, the battery 30 may be identified through detection of one or more signal voltages within a predefined range received via the male balance terminals 116A, B.

The controller 1010 of the battery charger 1000 may automatically set one or more charge current parameter settings to a setting appropriate for charging an 11.1V 3S LiPo battery 30 in response to identifying the battery 30 as comprising a 3S LiPo battery. For example, the controller 1010 may set the charge mode of the battery charger 1000 to balance charge the 3S LiPo battery. Additionally, or alternatively, the controller 1010 may set the charge rate of the battery charger 1000 by configuring the signal generator 1020 to generate a charge signal comprising an amperage suitable for charging a 3S LiPo battery. In an embodiment, one or more additional charge mode or current settings may still need to be set, adjusted, or selected by a user following identification of the battery 30 and automatic configuration of one or more charge mode or charge current parameters by the controller 1010 of the battery charger 1000. A limited number of charge mode and/or charge current settings may be selectable by a user for charging operation of the battery 30 identified as comprising a 3S LiPo battery. In some embodiments, the male communication device 106, which may be an RFID reader, may be required to support full self-configuration of all charge mode and/or charge current parameter settings of the battery charger 1000.

Figure 2:
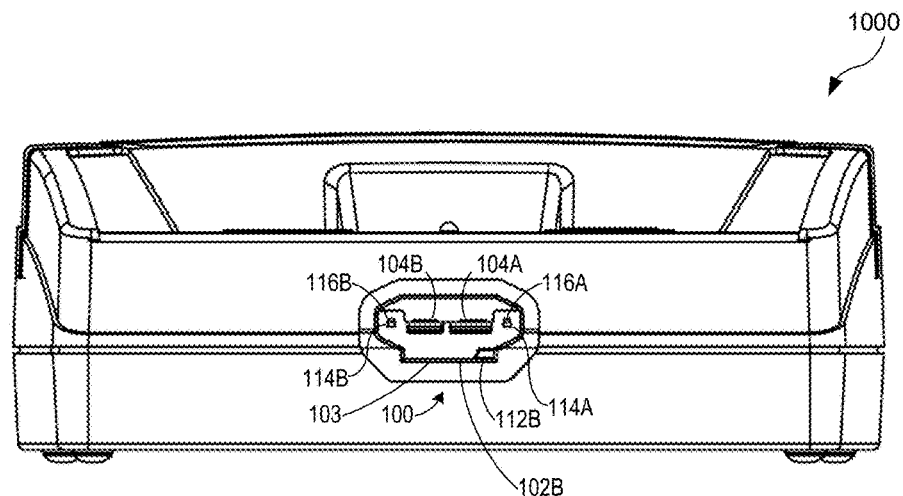
FIG. 2 depicts a battery charger provided with a connector port comprising a male connector.
Figure 6:
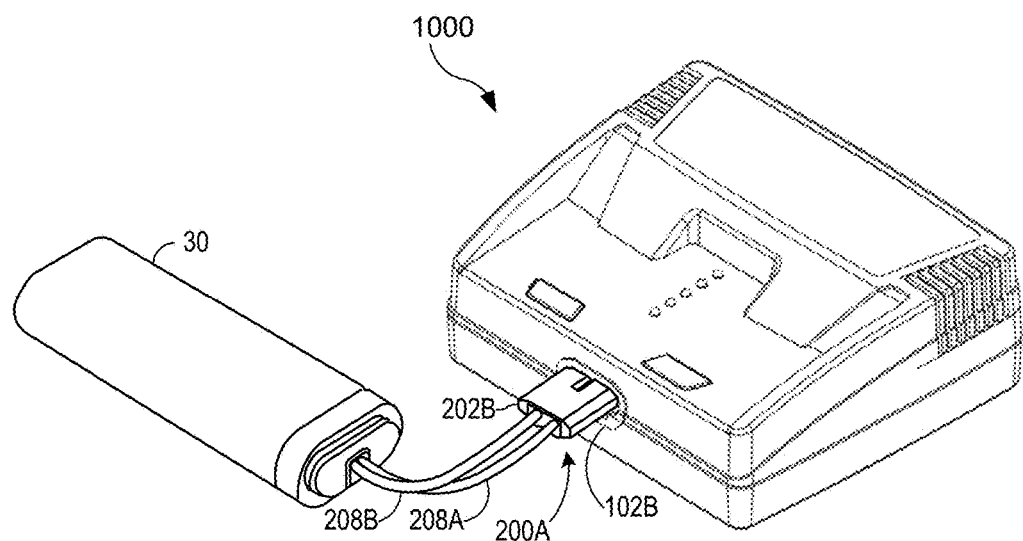
FIG. 6 depicts a battery electrically connected to a battery charger.

As shown in FIGS. 2, 6, and 16, an electrically powered device, such as an ESC or battery charger may comprise one or more connector ports comprising any embodiment of the male connector 100, as described above. Such ESCs or battery chargers may accommodate discharging or charging operation, respectively, of the battery 30, which may comprise any of the several chemistry types and/or cell counts (or cell counts) describe above, via only the respective electrical connections made between the male terminals 104, 116 of the male connector 100 and the corresponding female terminals 204, 216 of the female connector 200. No additional electrical connections between the battery 30 and the ESC or battery charger beyond those provided by the male and female connectors 100, 200 may be necessary. A user need only connect the battery 30 implemented with the female connector 200 to the connector port comprising an embodiment of the male connector 100 of the ESC or battery charger, regardless of the battery 30 chemistry type. The ESC or battery charger may identify the battery 30 chemistry and/or cell count through detecting of one or more electrical connections with the battery 30 at the respective male terminals 104, 116 and may self-configure one or more operational parameters of the ESC or battery charger in response to the identification of the battery 30.

Figure 17:
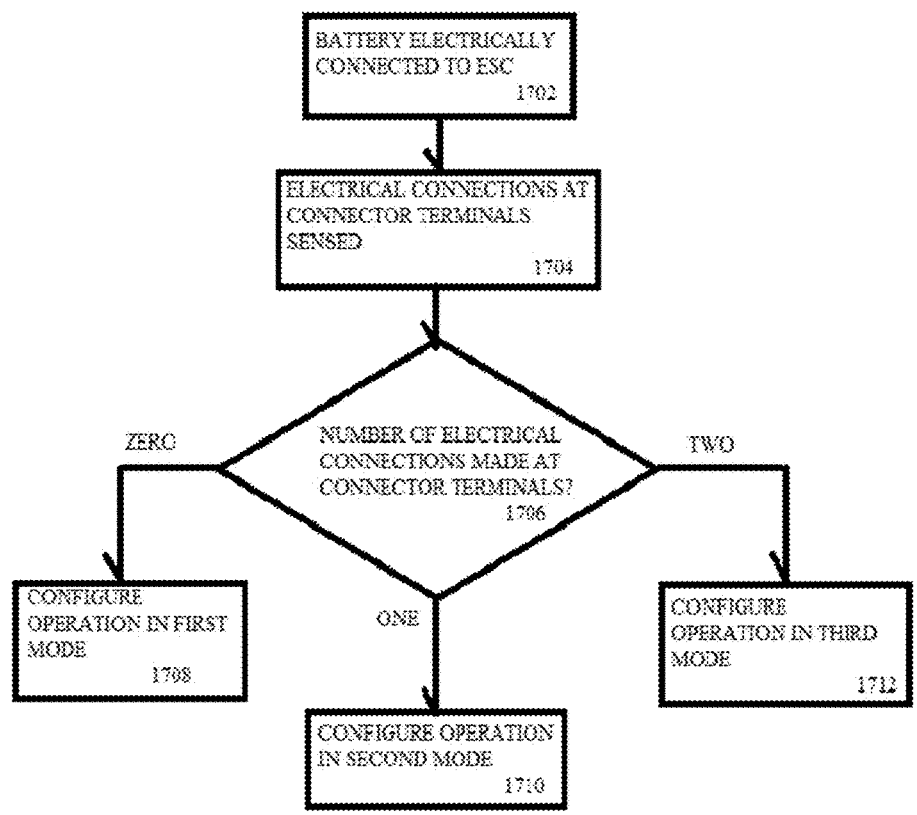
FIG. 17 depicts a control method of an ESC with a connection port comprising an embodiment of a male connector.

In an embodiment, an ESC 1000 implemented with the male connector 100, as described herein, may be operated in accordance with the method 1700, as shown in FIG. 17, to discharge the battery 30. The method 1700 may be implemented by the controller 1010 to select an appropriate discharge mode for the particular battery 30 electrically connected to the ESC 1000 via the male connector 100.

At the step 1702, the battery 30 may be electrically connected to the ESC 1000 via insertion of the female connector 200 of the battery within the male connector 100 of the ESC 1000. The controller 1010 may detect that an electrical connection is made at the male power terminals 104A, B. The controller 1010 may detect the occurrence of an electrical connection at the male power terminals 104A, B through sensing of a non-zero voltage power signal received from the battery 30 via the male power terminals 104A, B.

In response to detection of an electrical connection made at the male power terminals 104A, B, the controller 1010 may determine at the step 1704 whether additional electrical connections are made at one or both of the male balance terminals 116A, B. The controller 1010 may detect the occurrence of one or more electrical connections made at none, one, or both of the male balance terminals 116A and/or 116B through sensing of the voltage value of any signal, or signals, received via each of the male balance terminals 116A, B.

At the step 1706, the controller 1010 may determine the number of non-zero voltage signals received via the male balance terminals 116A, B. If the number of non-zero voltage signals received via the male balance terminals 116A, B is found to be zero, the controller 1010 may determine that no balance signals are received via the balance terminals 116A and 116B. The controller 1010 may respond to determining that no balance signals are received via the balance terminals 116A and 116B by identifying the battery 30 as not requiring balanced charging operation in accordance with a first operational mode at the step 1708. The controller 1010 may initiate operation of the ESC 1000 in accordance with a first mode at the step 1708 by generating a first control signal for setting at least a low voltage cutoff parameter to a first setting. The low voltage cutoff value may define the minimum remaining charge value to which the cell, or cells, of the battery 30 may be discharged. In an embodiment, the first setting may be equal to approximately 0V. The controller 1010 may operate the ESC 1000 to discharge the battery 30 until the battery is disconnected from the male connector 100 or until the first setting voltage is reached, at which point the controller 1010 will terminate discharging of the battery 30.

If the number of non-zero voltage signals received via the male balance terminals 116A, B is found to be one, the controller 1010 may determine that a single balance signals is received via the balance terminal 116A or 116B, only. The controller 1010 may respond to determining that a single balance signal is received via the balance terminal 116A or 116B, only, by identifying the battery 30 as requiring balanced discharging operation and may configure the ESC 1000 for operation in accordance with a second operational mode at the step 1710. The controller 1010 may initiate operation of the ESC 1000 in accordance with a first mode at the step 1710 by generating a second control signal for setting at least a low voltage cutoff parameter to a second setting. In an embodiment, the second setting may be equal to approximately 6.0V total, or 3.0V per cell of the battery 30. The controller 1010 may operate the ESC 1000 to discharge the battery 30 until the battery is disconnected from the male connector 100 or until the second setting voltage is reached, at which point the controller 1010 will terminate discharging of the battery 30.

If the number of non-zero voltage signals received via the male balance terminals 116A, B is found to be two, the controller 1010 may determine that balance signals are received via both of the balance terminals 116A and 116B, respectively, at the step 1712. The controller 1010 may respond to determining that a two balance signals are received via the balance terminal 116A and 116B, respectively, by identifying the battery 30 as requiring balanced discharging operation and may configure the ESC 1000 for operation in accordance with a third operational mode. The controller 1010 may initiate operation of the ESC 1000 in accordance with a third mode at the step 1712 by generating a third control signal for setting at least a low voltage cutoff parameter to a third setting. In an embodiment, the third setting may be equal 9.0V total, or 3.0V per cell of the battery 30. The controller 1010 may operate the ESC 1000 to discharge the battery 30 until the battery 30 is disconnected from the male connector 100 or until the third setting voltage is reached, at which point the controller 1010 will terminate discharging of the battery 30.

In an alternative embodiment, the controller 1010 may be implemented with logic defining one or more low voltage step-down parameter values, which may define a remaining charge value on the battery 30 at which the power consumed by the ESC 1000 discharging the battery 30 is reduced. In an embodiment, the maximum power consumption rate of the ESC 1000 may be reduced to, perhaps, 50% of the normal consumption rate. The controller 1010 may be configured to operate at the lower power consumption rate upon reaching a low voltage step-down parameter value and remain at that power consumption level until discharging of the battery 30 is terminated via disconnection of the battery 30 or upon reaching the low voltage cutoff value of the battery 30. In an embodiment, the low voltage step-down parameter value may be set to approximately 3.66V per cell of the battery. Accordingly, the low voltage step-down parameter value may be set to 7.32V at the step 1710 or to 10.98V at the step 1712.

Figure 18:
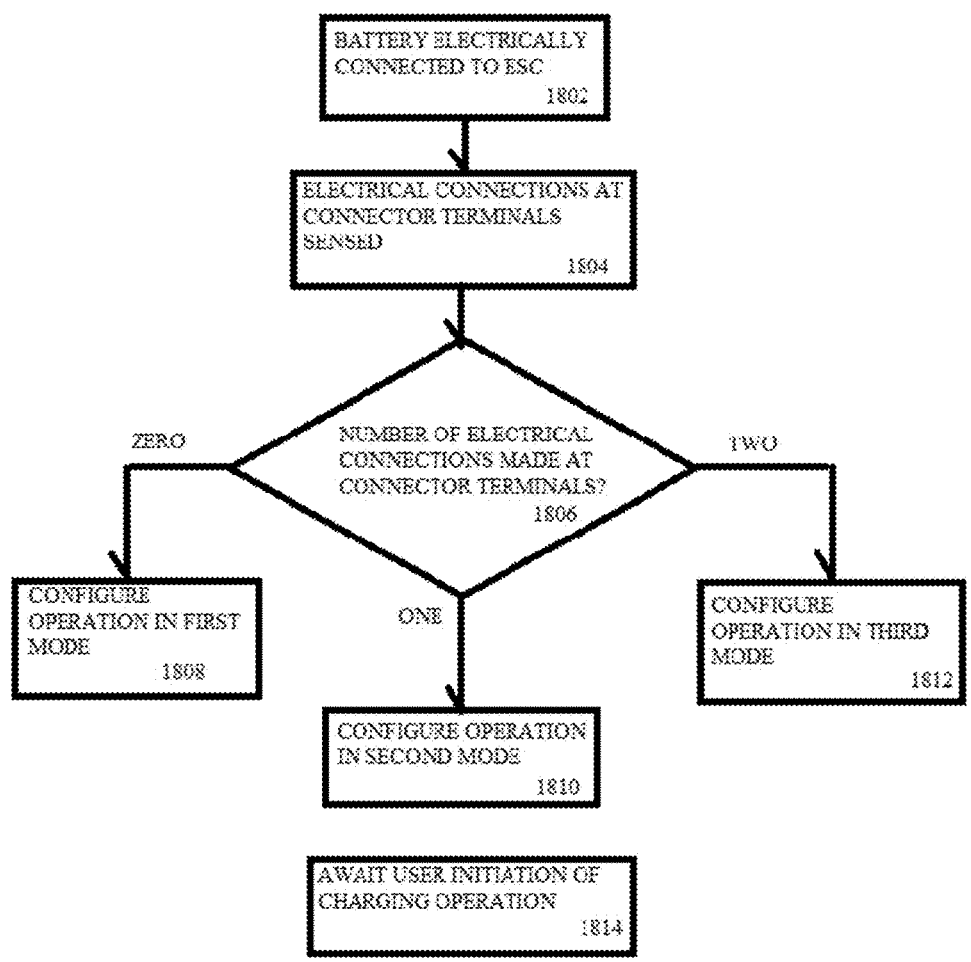
FIG. 18 depicts a control method of a battery charger with a connection port comprising an embodiment of a male connector.

A battery charger 1000 may be implemented with the male connector 100, as described herein, may be operated in accordance with the method 1800, as shown in FIG. 18, to detect the type and cell count of a battery 30 to be charged. The method 1800 may be implemented by the controller 1010 to set or modify one or more charge setting parameters of the battery charger 1000 in response to the specific chemistry or capacity of the battery 30 detected.

At the step 1802, the battery 30 may be electrically connected to the battery charger 1000 via insertion of the female connector 200 of the battery within the male connector 100 of the battery charger 1000. The controller 1010 may detect that an electrical connection is made at the male power terminals 104A, B. The controller 1010 may detect the occurrence of an electrical connection at the male power terminals 104A, B through sensing of a non-zero voltage power signal received from the battery 30 via the male power terminals 104A, B.

In response to detection of an electrical connection made at the male power terminals 104A, B, the controller 1010 may determine at the step 1804 whether additional electrical connections are made at one or both of the male balance terminals 116A, B. The controller 1010 may detect the occurrence of one or more electrical connections made at none, one, or both of the male balance terminals 116A and/or 116B through sensing of the voltage value of any signal, or signals, received via each of the male balance terminals 116A, B.

At the step 1806, the controller 1010 may determine the number of non-zero voltage signals received via the male balance terminals 116A, B. If the number of non-zero voltage signals received via the male balance terminals 116A, B is found to be zero, the controller 1010 may determine that no balance signals are received via the balance terminals 116A and 116B. The controller 1010 may respond to determining that no balance signals are received via the balance terminals 116A and 116B by identifying the battery 30 as not requiring balanced charging operation in accordance with a first operational mode at the step 1808. In an embodiment, the first operational mode may include parameter settings defining one or more of the charging methods used by the battery charger 1000, the voltage or current values of the charge current, one or more peak voltage values, and the like. The controller 1010 may remain at the step 1808, configured to initiate a charging operation in accordance with a first mode at the step 1808 until a user generated command is received by the battery charger 1000 at the step 1814.

If the number of non-zero voltage signals received via the male balance terminals 116A, B is found to be one, the controller 1010 may determine that a single balance signals is received via the balance terminal 116A or 116B, only. The controller 1010 may respond to determining that a single balance signal is received via the balance terminal 116A or 116B, only, by identifying the battery 30 as requiring balanced charging operation and may configure the battery charger 1000 for operation in accordance with a second operational mode at the step 1810. In an embodiment, the second operational mode may include parameter settings defining one or more of the charging methods used by the battery charger 1000, the voltage or current values of the charge current, one or more peak voltage values, and the like. The controller 1010 may remain at the step 1810, configured to initiate a charging operation in accordance with a second mode at the step 1810 until a user generated command is received by the battery charger 1000 at the step 1814.

If the number of non-zero voltage signals received via the male balance terminals 116A, B is found to be two, the controller 1010 may determine that balance signals are received via both of the balance terminals 116A and 116B, respectively, at the step 1806. The controller 1010 may respond to determining that a two balance signals are received via the balance terminal 116A and 116B, respectively, by identifying the battery 30 as requiring balanced charging operation and may configure the battery charger 1000 for operation in accordance with a third operational mode at the step 1812. In an embodiment, the third operational mode may include parameter settings defining one or more of the charging methods used by the battery charger 1000, the voltage or current values of the charge current, one or more peak voltage values, and the like. The controller 1010 may remain at the step 1812, configured to initiate a charging operation in accordance with a third mode at the step 1812 until a user generated command is received by the battery charger 1000 at the step 1814.

Having thus described the present invention by reference to certain of its exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of exemplary embodiments. Accordingly, it is appropriate that any claims supported by this description be construed broadly and in a manner consistent with the scope of the invention.

The invention claimed is:

1. A female electrical connector configured to electrically connect to a rechargeable battery, comprising:
    a female housing formed from an insulating material and comprising:
        a female receptacle comprising:
            a female terminal abutting one surface of the female receptacle;
            a resilient member abutting another surface of the female receptacle opposite to the one surface and insulated from the female terminal;
        a female extended portion comprising:
            a female keying feature;
            wherein the female keying feature indicates a type of the rechargeable battery and facilitates a supported electrical connection between the female electrical connector and a male electrical connector;
        wherein the female extended portion is at least partially receivable within the male electrical connector when a male terminal of the male electrical connector is slidably engaged between the female terminal and the resilient member and electrically coupled to the female terminal.

2. The female electrical connector of claim 1, the female extended portion further comprising:
    an additional female keying feature comprising a cutout portion disposed substantially at a corner of the female extended portion along another outer surface distant to the outer surface comprising the female keying feature.

3. The female electrical connector of claim 2, wherein the type of the rechargeable battery is a Nickel metal hydride chemistry rechargeable battery and the supported connection is with an electrically powered device operable to charge or discharge the Nickel metal hydride chemistry rechargeable battery.

4. The female electrical connector of claim 2, wherein the type of the rechargeable battery is a Lithium polymer chemistry rechargeable battery and the supported connection is with an electrically powered device operable to charge or discharge the Lithium polymer chemistry rechargeable battery.

5. The female electrical connector of claim 1 wherein the female keying feature is a groove.

6. The female electrical connector of claim 1, wherein the type of the rechargeable battery is a Nickel metal hydride chemistry rechargeable battery and the supported connection is with an electrically powered device operable to charge or discharge the Nickel metal hydride chemistry rechargeable battery.

7. The female electrical connector of claim 1, wherein the type of the rechargeable battery is a Lithium polymer chemistry rechargeable battery and the supported connection is with an electrically powered device operable to charge or discharge the Lithium polymer chemistry rechargeable battery.

8. The female electrical connector described in claim 1, further comprising:
    a rechargeable battery;
    wherein the rechargeable battery is electrically coupled to the female terminal.

9. A female electrical connector of a rechargeable battery, comprising:
    a female housing formed from an insulating material and comprising:
        a female receptacle comprising:
            a female terminal abutting one surface of the female receptacle;
            a resilient member abutting another surface of the female receptacle opposite to the one surface and insulated from the female terminal;
        a female extended portion comprising:
            a female keying feature formed on an outer surface of the female extended portion indicating a type of the rechargeable battery; and
            a cutout portion disposed substantially at a corner of another outer surface of the female extended portion opposite to the outer surface comprising the female keying feature;
        wherein the female extended portion is at least partially receivable within a male electrical connector when a male terminal of the male electrical connector is slidably engaged between the female terminal and the resilient member and electrically coupled to the female terminal; and
        wherein the female extended portion is configured to permit a supported electrical connection between the female electrical connector and the male electrical connector.

10. The female electrical connector of claim 9, wherein the type of the rechargeable battery is a Nickel metal hydride chemistry rechargeable battery and the supported connection comprises an electrical connection with an electrically powered device operable to charge or discharge the Nickel metal hydride chemistry rechargeable battery.

11. The female electrical connector of claim 9, wherein the type of the rechargeable battery is a Sub-C size rechargeable battery and the supported connection comprises an electrical connection with an electrically powered device operable to charge or discharge the Sub-C size rechargeable battery.

12. The female electrical connector of claim 9, wherein the type of the rechargeable battery is a Nickel metal hydride chemistry rechargeable battery and the supported connection comprises an electrical connection with an electrically powered device operable to charge or discharge the Nickel metal hydride chemistry rechargeable battery.

13. The female electrical connector of claim 9, wherein the type of the rechargeable battery is a Sub-C size rechargeable battery and the supported connection comprises an electrical connection with an electrically powered device operable to charge or discharge the Sub-C size rechargeable battery.

* * * * *